United States Patent
Pompei et al.

[11] Patent Number: 5,083,727
[45] Date of Patent: Jan. 28, 1992

[54] AIRCRAFT CABIN SYSTEM FOR SELECTIVLEY LOCATING INTERIOR UNITS

[75] Inventors: Arturo Pompei, Seattle; Alan C. Oldershaw, Everett; Albert S. Ballard, Kirkland; Bruce S. Elting, Lynnwood, all of Wash.

[73] Assignee: The Boeing Company, Seattle, Wash.

[21] Appl. No.: 460,240

[22] Filed: Jan. 2, 1990

[51] Int. Cl.$^5$ .................... B64D 11/02; B64D 11/06; B64D 13/00; B61D 17/00
[52] U.S. Cl. ................... 244/118.6; 244/118.5; 105/345; 4/661
[58] Field of Search .......... 244/118.5, 118.6, 119; 105/315, 323, 345; 296/63, 64, 65.1; 52/64, 65, 74.1; 4/661, 663, 664

[56] References Cited

U.S. PATENT DOCUMENTS

| | | | |
|---|---|---|---|
| 1,790,988 | 2/1931 | Lalli | 244/118.5 |
| 2,077,910 | 4/1937 | Thomson | 244/118.5 |
| 2,396,039 | 3/1946 | Burton et al. | 244/118.5 |
| 2,582,003 | 1/1952 | Candlin | 105/315 |
| 2,681,016 | 6/1954 | Candlin, Jr. | 244/118.5 |
| 2,710,731 | 6/1955 | Bright et al. | 244/118 |
| 2,953,103 | 9/1960 | Bohannon et al. | 244/118.6 |
| 3,118,187 | 1/1964 | Alimanestiano | 105/315 |
| 3,480,239 | 11/1969 | Jensen et al. | 244/118.1 |
| 3,578,274 | 5/1971 | Ginn et al. | 244/118.6 |
| 4,066,227 | 1/1978 | Buchsel | 244/118.6 |
| 4,100,857 | 7/1978 | Gutridge et al. | 105/315 |
| 4,185,799 | 1/1980 | Richards, Jr. | 244/118.5 |
| 4,456,206 | 6/1984 | Tijssen | 244/118.5 |
| 4,458,864 | 7/1984 | Colombo et al. | 244/118.5 |
| 4,493,470 | 1/1985 | Engel | 248/503.1 |
| 4,648,570 | 3/1987 | Abdelmaseh et al. | 244/118.1 |
| 4,884,767 | 12/1989 | Shibata | 244/118.5 |

FOREIGN PATENT DOCUMENTS 3007733 9/1981 Fed. Rep. of Germany.
WO81/00836 4/1981 PCT Int'l Appl..

Primary Examiner—Joseph F. Peters, Jr.
Assistant Examiner—Virna Lissi Mojica
Attorney, Agent, or Firm—Christensen, O'Connor, Johnson & Kindness

[57] ABSTRACT

An aircraft cabin system is provided in an aircraft for selectively locating interior units such as galleys and lavatories. The system includes floor fittings in the wall panels that secure the units to seat tracks that run the length of the fuselage. Some units are provided with tie-down bars that are secured to overhead frame fittings that are located throughout the aircraft. Electrical, water, and air utility services are provided through separate distribution lines that extend through the aircraft. The distribution lines are provided with spaced-apart couplings so that wherever an interior unit is located, it can be provided with services through adjacent couplings. Galley waste water is stored in a tank built into a food storage cart that is normaly attached to the galley. The lavatories are attached to a collection system that includes a set of modular and telescoping pipe sections which are assembled to length needed to connect the lavatories to a set of holding tanks.

31 Claims, 21 Drawing Sheets

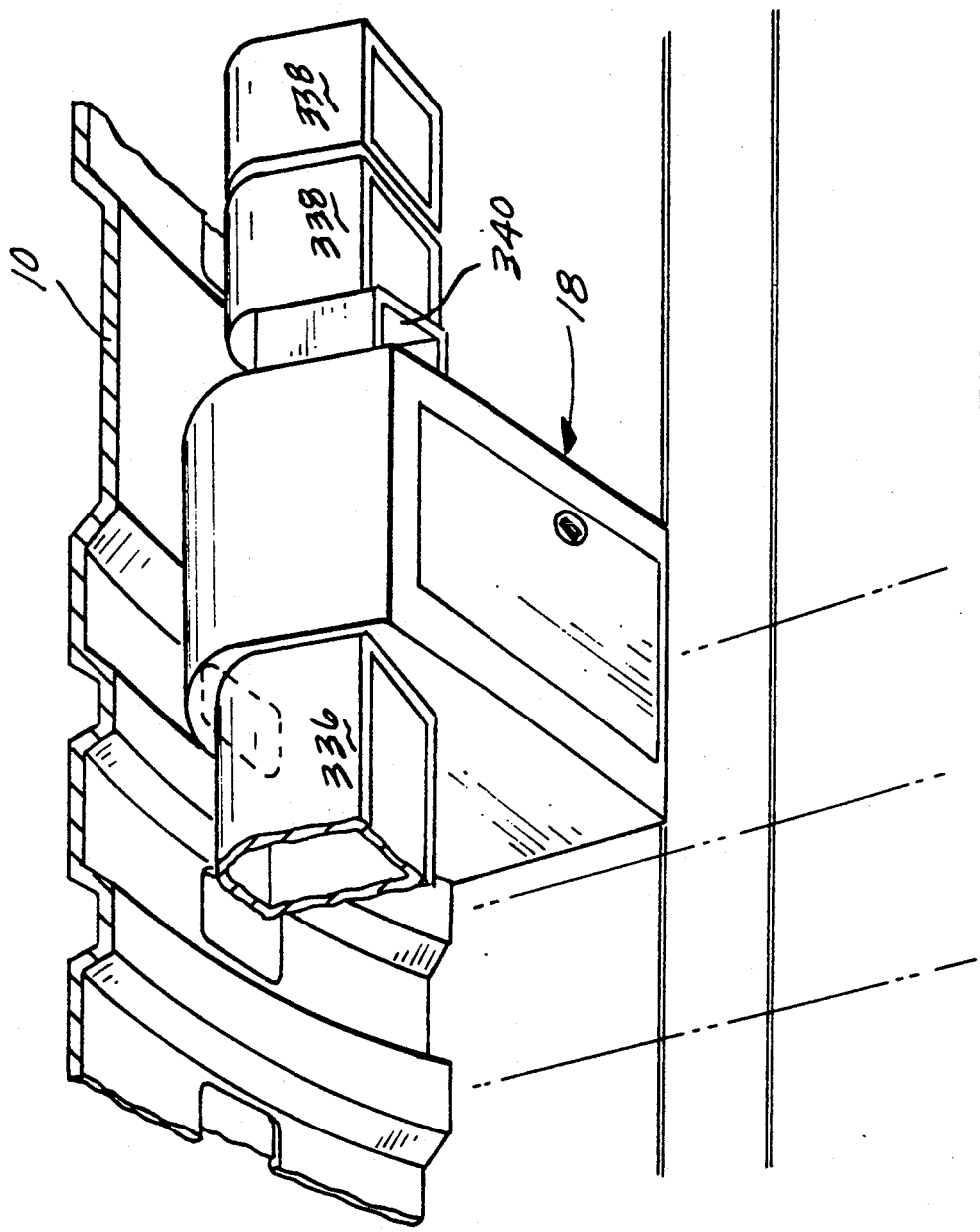

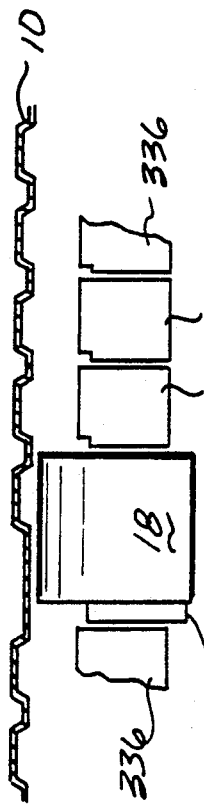
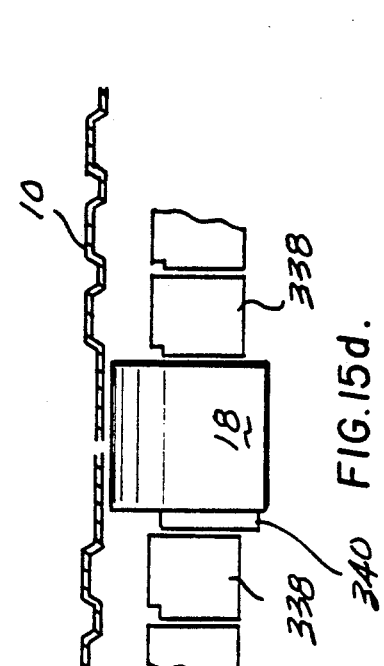
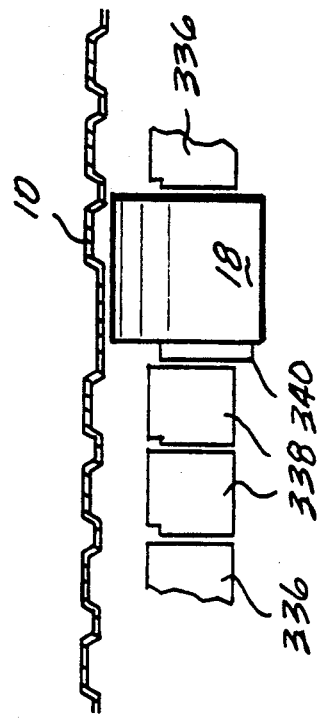
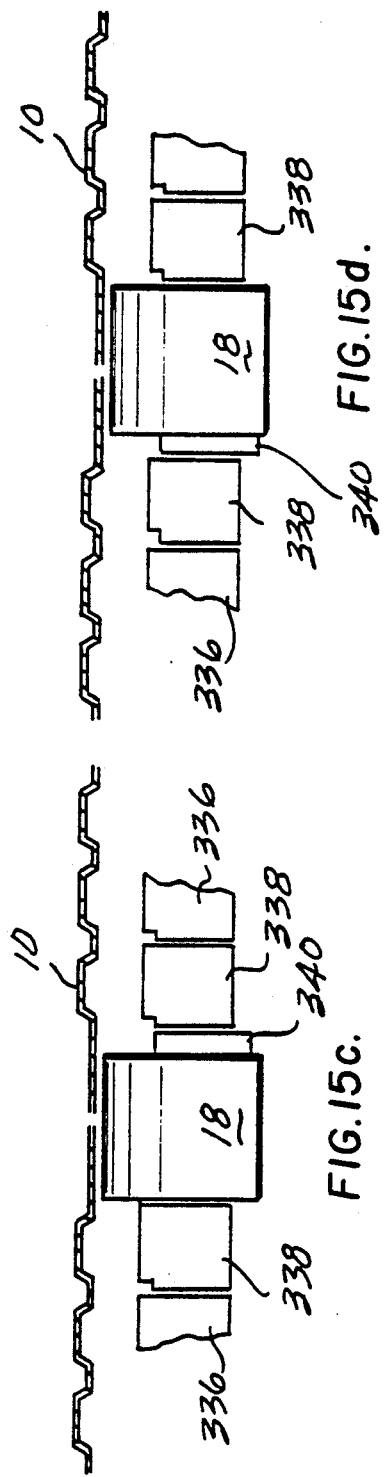
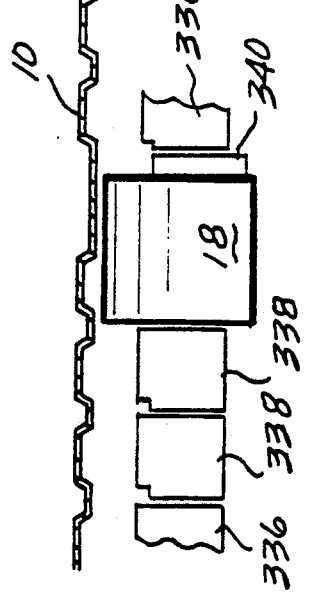

AIRCRAFT CABIN SYSTEM FOR SELECTIVLEY LOCATING INTERIOR UNITS

FIELD OF THE INVENTION

This invention relates generally to an aircraft cabin system for locating cabin interior units such as galleys and lavatories, and more specificially, to an aircraft cabin system that allows the units to be selectively located in a number of different positions in the aircraft.

BACKGROUND OF THE INVENTION

Commercial aircraft are provided with galleys so that passengers can be served food in-flight and with lavatories so that passengers can take care of their biological needs. Galleys and lavatories also serve as boundaries between different seating sections in an aircraft. Thus, galleys and lavatories are frequently located between the first class and business sections and between the business and coach sections on many commercial aircraft.

During the lifetime of an aircraft, an airline may want to periodically change the configuration of an aircraft and/or change the number of seats available in each cabin section. For example, there may be times during the year that an airline would want to increase the number of available first class seats by reducing the size of the coach section. At other times, the airline may want a larger number of coach seats at the expense of the first class seats. There are even instances when an airlines may want to remove all seats in a section in order to create a lounge section.

Whenever an aircraft is reconfigured, it is desirable to move the galleys and lavatories in order to establish the desired boundaries and establish the appropriate effect in the aircraft cabin. In many current aircraft, relocating these units to the desired locations can be a difficult, if not impossible, task. These units are typically secured to complementary fittings integral with floor beams and overhead fuselage sections. Unbolting and resecuring the units typically involves a significant amount of manual labor with persons having to work above and below the main cabin floor of the aircraft. Moreover, galleys and lavatories can only be relocated to locations where there are complementary fittings. Thus, if an airlines wants to reposition a galley or a lavatory by only a seat row or two, and the aircraft is not provided with the complementary fittings at the new location, the unit cannot be moved to the desired location.

Still another factor that limits the ability to relocate aircraft galleys and lavatories is the availability of utility service connections. Air, water, and electrical power typically all have to be supplied to galleys and lavatories. Waste water must be drained from these units. Galleys and lavatories must be located near the inlet and outlet connections for the air, water and electrical service systems. Some aircraft have a few spaced outlet and inlet air, water and electrical couplings that allow some variation in where galleys and lavatories can be located. However, in these aircraft, the units cannot be located far from the inlet and outlet couplings. This restricts the ability to relocate the units to all but a few specific locations.

SUMMARY OF THE INVENTION

This invention provides a new and useful aircraft cabin system for selectively locating cabin interior units such as galleys and lavatories anywhere within designated areas inside an aircraft fuselage. The aircraft cabin system of this invention includes a tie-down system for securing galleys and lavatories to the cabin floor and fuselage of an aircraft at any one of a number of closely spaced locations along the aircraft. The invention further includes aircraft electrical, water and air supply distribution systems that can be used to supply air and water to the galleys and lavatories regardless of where the units are located. The system also includes waste water collection systems that can similarly be adjusted for changes in the location of a galley or lavatory.

The aircraft cabin system of this invention includes galleys and lavatories with floor fittings that secure the units to complementary seat tracks and the floor of the aircraft. The seat tracks have a number of closely spaced fitting voids so that the galleys and lavatories can be secured to the aircraft floor at one of a number of closely spaced locations. Galleys, which are located along the centerline of the aircraft, and some centerline lavatories are secured to the top of the fuselage by tie-down bars that are selectively positioned to the top of the unit and which are connected at their opposite end to any of a number of fittings secured to the top of the fuselage.

Air, water, and electricity are supplied to the galley and lavatories through distribution lines that extend the length of the aircraft. The distribution lines are provided with outlet couplings to which complementary inlet lines on the galley and the lavatories are connected. The water distribution line further has a number of branches to which sidewall located lavatories are connected. Waste water from the galleys is collected in tanks located in portable food storage carts that are located under the galley sinks. The lavatory waste system has a collection system that includes modular and telescopic pipe sections. The modular sections are used to bring the end of waste inlet lines to the general vicinity of the lavatory. The telescopic sections are of adjustable length and are used to attach the waste outlets of the lavatories to the end of the modular pipe assemblies.

Portable overhead storage bins and a portable literature rack are mounted around the sidewall lavatories to maximize the storage space on the aircraft and to provide an aesthetically pleasing appearance.

The aircraft cabin system of this invention makes it possible to locate galleys and lavatories in almost any selected position in an aircraft. The floor fittings and tie-down bars enable the units to be secured to the aircraft floor and fuselage regardless of their positions. The galleys and lavatories can readily be connected and disconnected to the air, water, and electrical distribution lines wherever it is desirable to relocate one of the units. The tanks in the food storage carts provide a convenient means for collecting galley waste water. The modular and telescopic lavatory waste collection pipes minimize the time required to connect the lavatories to waste holding tanks and maximize the locations where the lavatories can be positioned.

The aircraft cabin system of this invention is thus useful for providing galleys and lavatories that can be used to provide boundaries at almost any location in the aircraft. Moreover, this system eliminates the needs to specify at the time of aircraft manufacture where fittings for the galleys and lavatories should be located.

BRIEF DESCRIPTION OF THE DRAWINGS

The invention is defined with particularity in the appended claims. The advantages of this invention may be better understood by referring to the following detailed description in which:

FIG. 15a is a perspective view of one placement of the side lavatory, overhead storage bins and overhead literature according to this invention, and FIGS. 15b-f are top views of how the side lavatory can be repositioned according to this invention;

DETAILED DESCRIPTION OF THE PREFERRED EMBODIMENT

Figure 1:
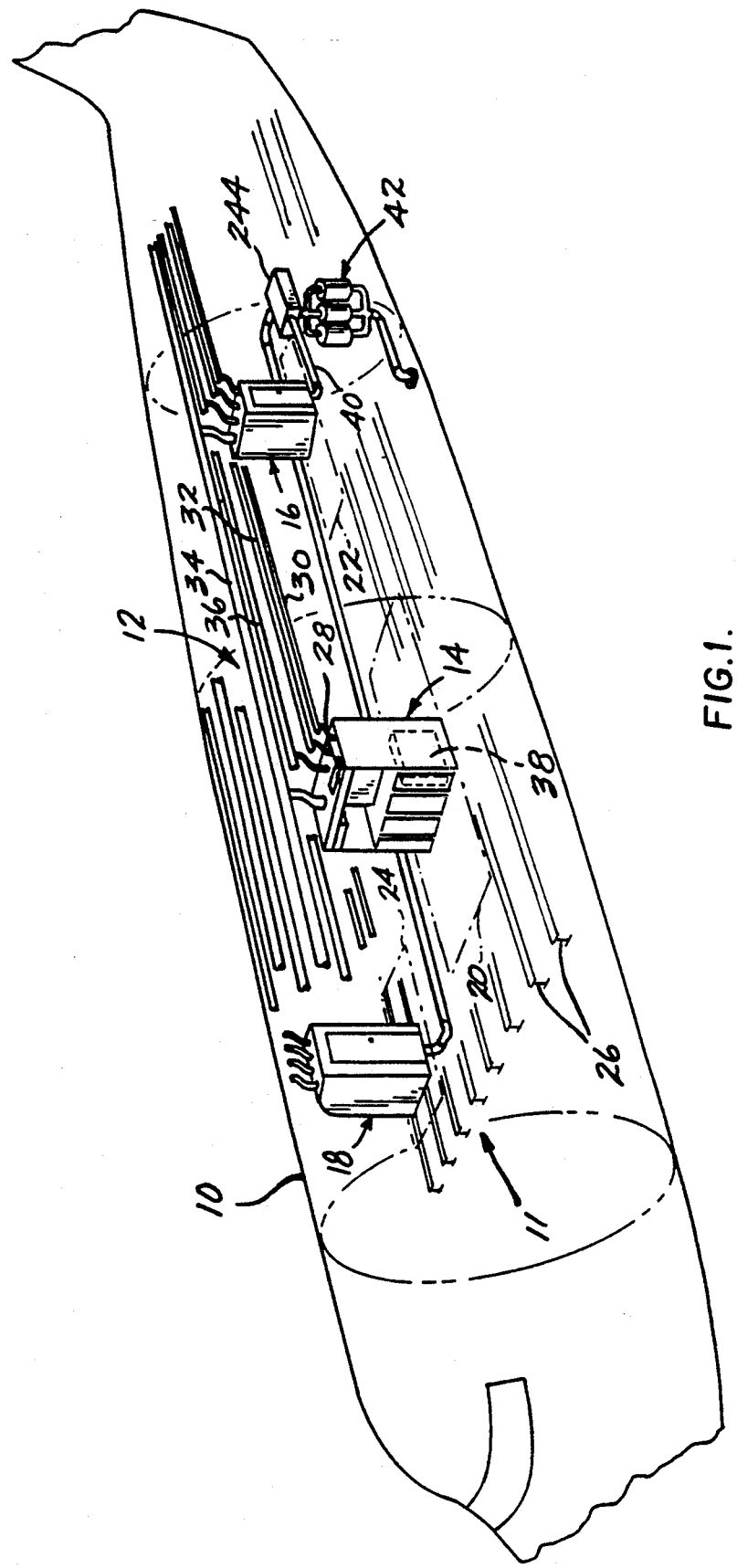
FIG. 1 is a perspective view of the inside of an aircraft fuselage wherein the aircraft cabin system of this invention is employed.

FIG. 1 depicts the inside of an aircraft fuselage 10 with a cabin floor 11 wherein aircraft cabin system 12 of this invention provides a selectively located galley 14, a centerline lavatory 16, and a sidewall lavatory 18. The galley 14 is located in any number of locations on the cabin floor 11 within a rectangular area 20; the centerline lavatory 16 is located in any number of locations within area 22; and, the sidewall lavatory 18 is located within a number of intermediately spaced locations within rectangular area 24 (rectangular areas shown in phantom). The galley 14 and the lavatories 16 and 18 are secured to seat tracks 26 in the cabin floor 11 that run the length of the fuselage 10. A pair of tie-down assemblies 28 secure the galley 14 to the top of the fuselage 10. Utility service connections are provided between the galley 14 and the lavatories 16 and 18 and an electrical power cable 30, a water line 32, a vent duct 34 and a gasper air line 36, that are located in the overhead section of the fuselage 10. A galley waste water collection system 38 collects and stores waste water from the galley 14. Waste from the lavatories 16 and 18 is piped through a lavatory waste collection system 40 for storage in lavatory waste holding tanks 42.

Figure 2:
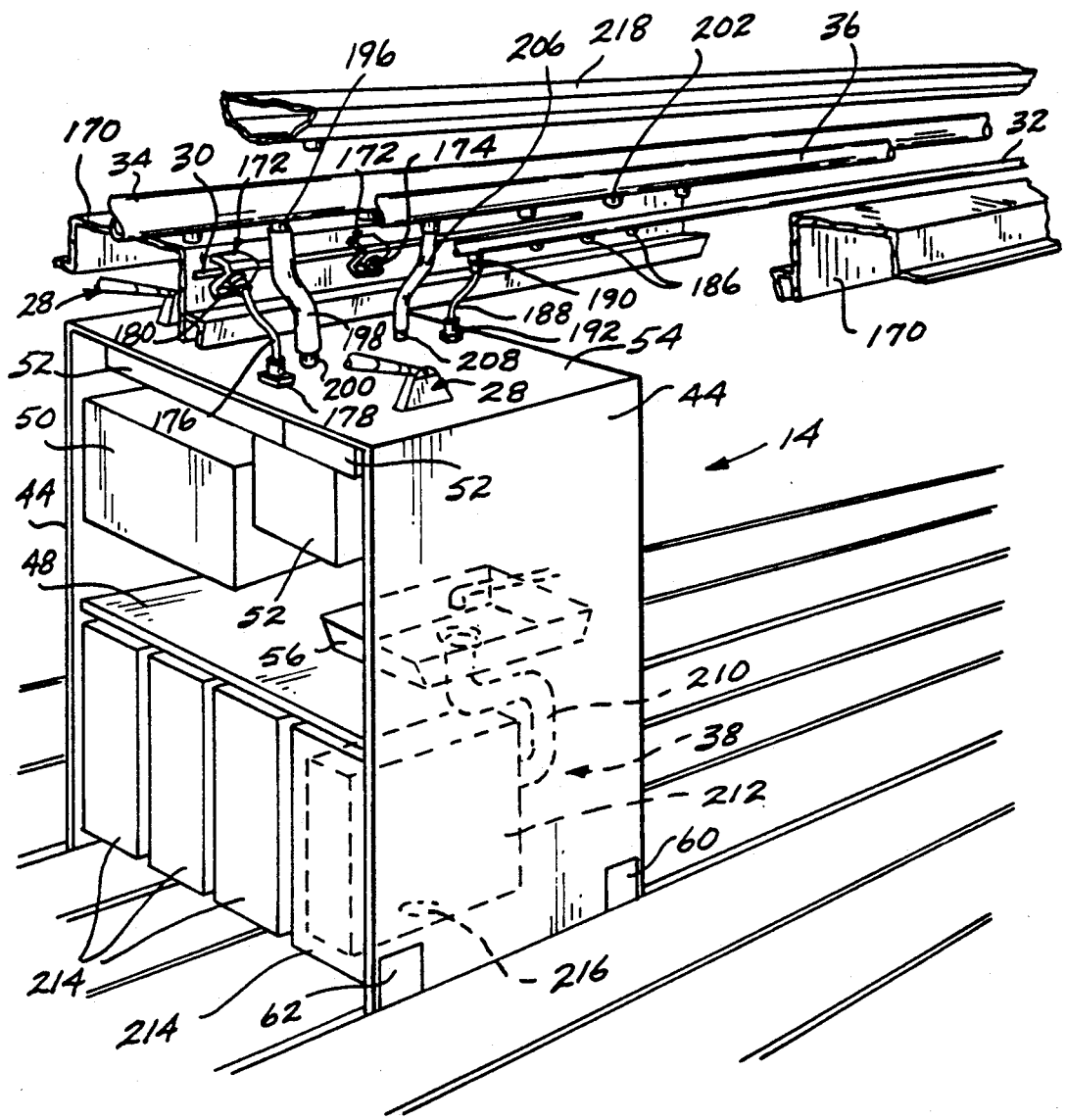
FIG. 2 is a perspective view of a galley unit secured in an aircraft according to the system of this invention.

The aircraft cabin system 12 is explained in detail by initial reference to FIG. 2 which depicts the galley 14 and connections thereto in detail. The galley 14 is a U-shaped unit composed out of two longitudinally extending sidewall panels 44 and a laterally extending rear wall panel 46 (FIG. 3) that extends therebetween. A waist-high counter 48 extends between the sidewall panels 44. A warming oven 50 and storage bins 52 are mounted to a galley top panel 54 spaced above the counter 48. A small sink with faucet 56 is mounted to the counter 48. The galley 14 is illuminated by lights (not illustrated) in the top panel 54.

Figures 3, 3D:
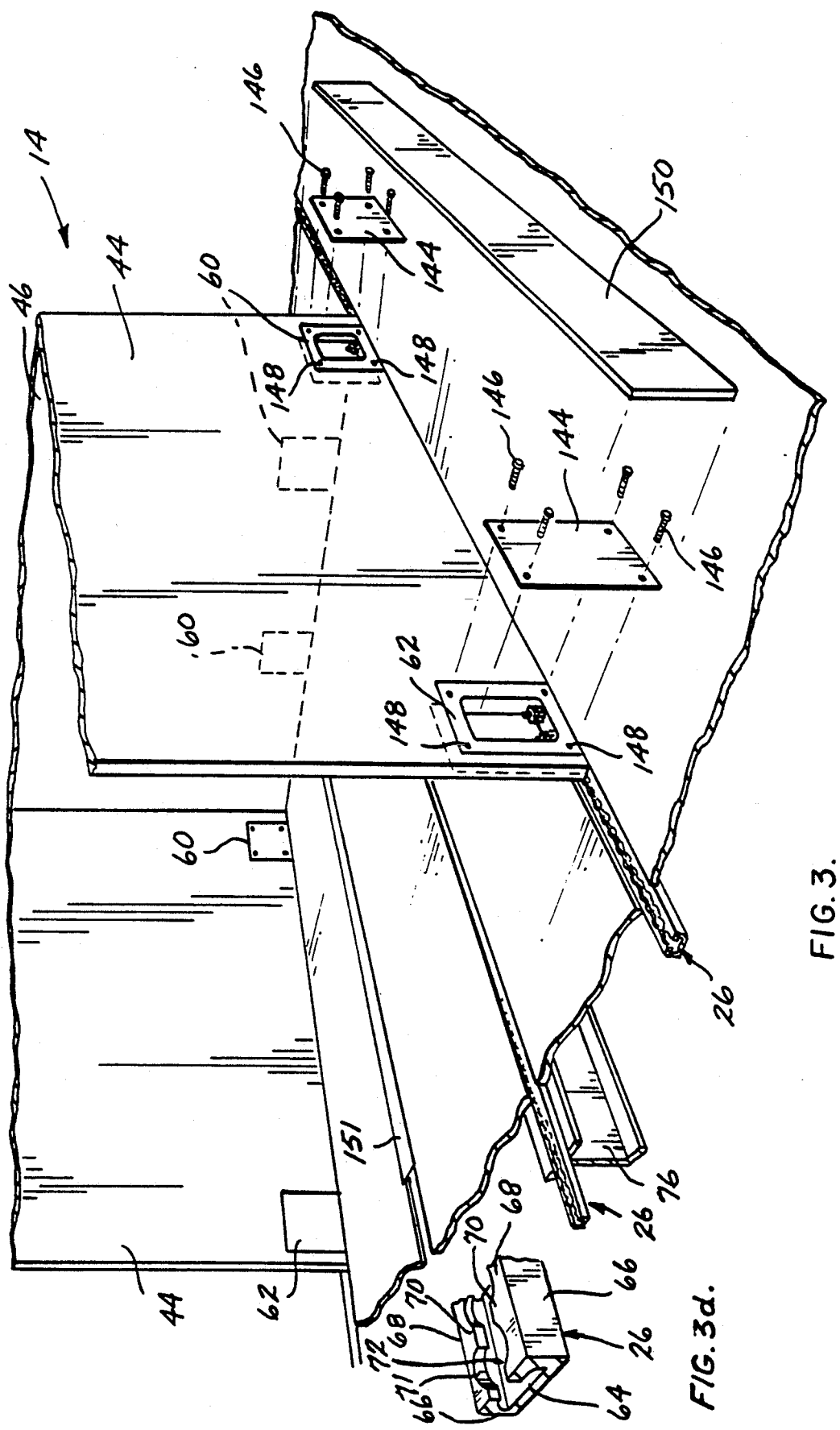
FIG. 3 is a perspective and exploded view of the arrangement of the floor panel fittings used to secure the galley of FIG. 2 to an aircraft cabin floor.
FIG. 3d is a magnified view of the seat track of FIG. 3.

The galley 14 is secured to the seat tracks 26 by floor fittings 60 and 62 that are located in the base of the galley wall panels 44 and 46 as depicted in FIG. 3. Each seat track 26, as shown in detail in FIG. 3d, is formed from an integral piece of metal and includes a base 64 which is connected to an aircraft structural support member as will be described hereinafter. A pair of opposed side sections 66 extend upward from the lateral edges of the track base 64. Attached to the side sections 66 are spaced-apart, opposed flanges 68 that are spaced above the track base 64 and which are individually directed toward each other. The flanges 68 have opposed lips 70 with arcuate side edges 71 that define a series of spaced-apart bolt voids 72 between the lips along the length of the seat track 26. As will be discussed in more detail hereinafter, the fittings 60 and 62 are selected to withstand different acceleration forces so as to ensure that the galley 14 stays secured to the cabin floor 11.

Figure 4:
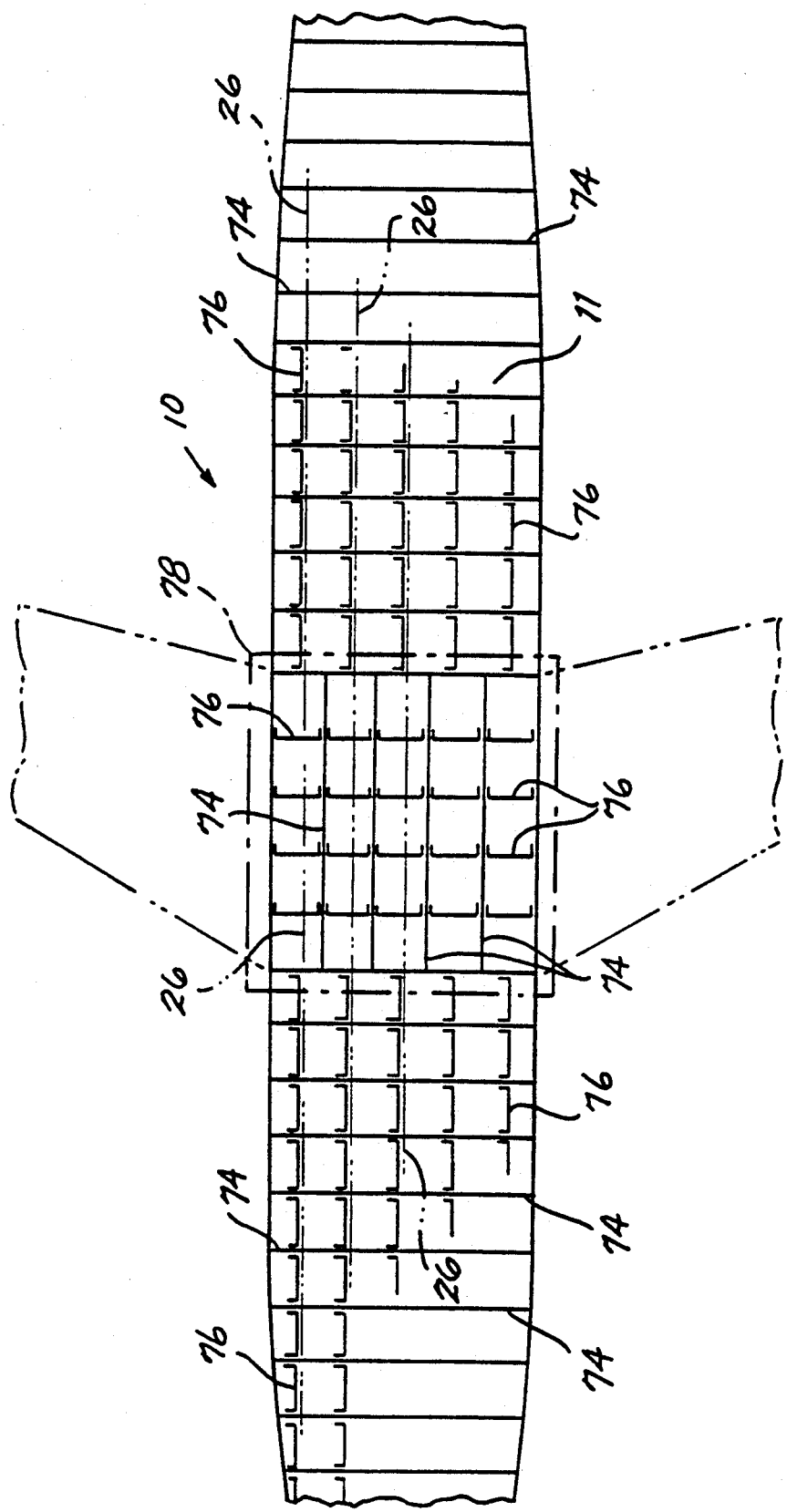
FIG. 4 is a diagrammatic view of how seat tracks to which the floor fittings are secured to floor beams and intercostals underneath the aircraft cabin floor.

FIG. 4 depicts diagrammatically how the seat tracks 26 are attached to floor beams 74 and intercostals 76 that provide structural support for the cabin floor 11. Throughout most of the cabin floor 11, the floor beams 74, which are depicted as solid lines, extend laterally across the fuselage 10. The intercostals 76, which are represented as brackets, extend longitudinally between the floor beams 74. The exception to this is in a wing box area 78 (delineated in phantom) which is the portion of the fuselage 10 adjacent where the wings are joined. In the wing box 78, the floor beams 74 extend longitudinally through the box, and the intercostals 76 extend laterally between the floor beams. Along the cabin floor 11, except in the vicinity of the wing box 78, the seat tracks 26 (depicted as dashed lines) are mounted to the top of the intercostals 76. In the wing box 78, the seat tracks 26 are mounted perpendicularly across the top of the intercostals 76 with known fasteners such as bolts and clamps (not illustrated).

Figure 5A:
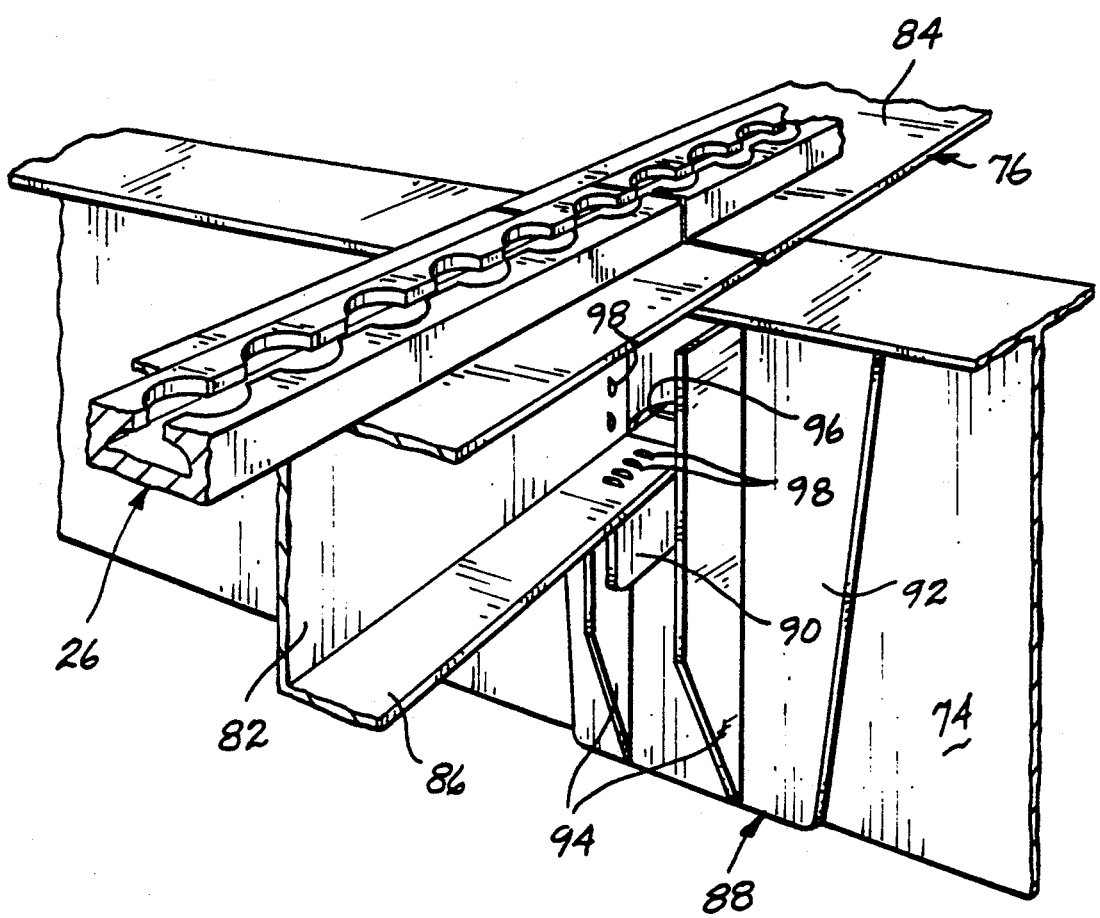
FIGS. 5a and b are detailed views of the reversible intercostal beams the seat track is mounted on according to this invention.
Figure 5B:
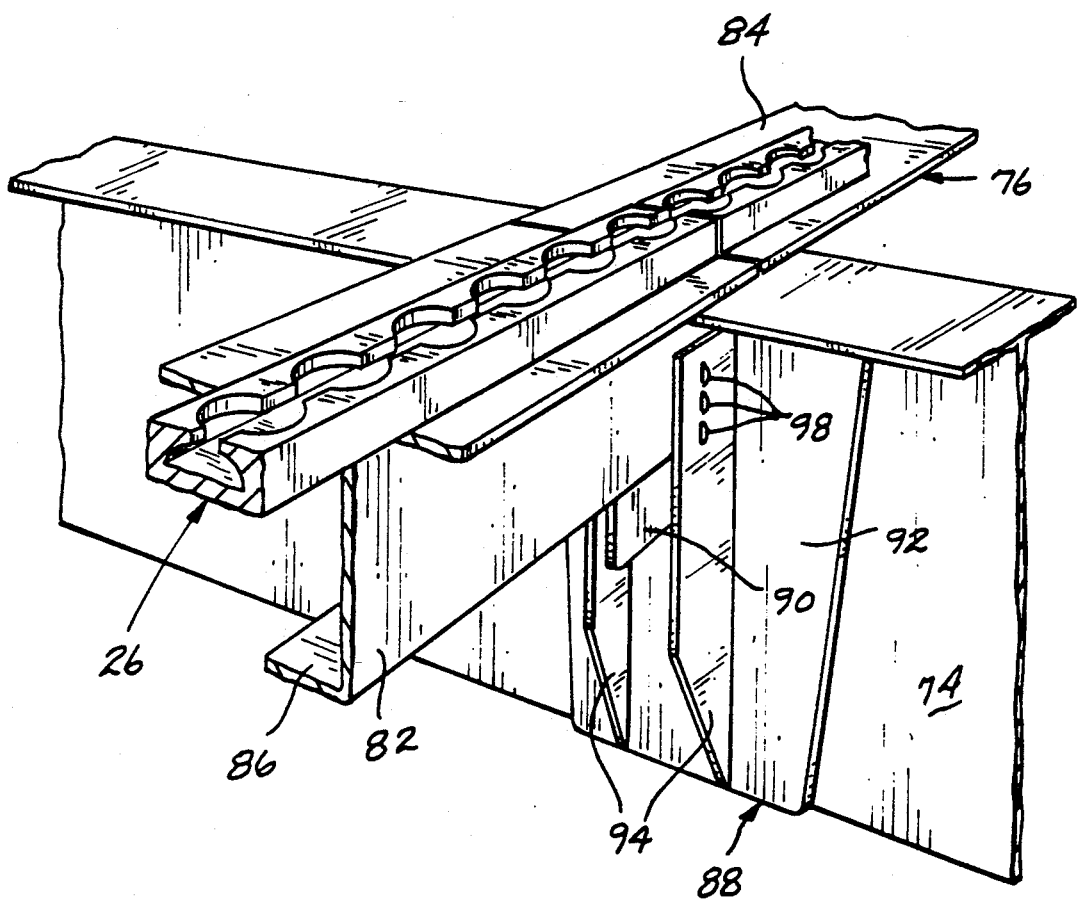

The intercostals 76 with top-mounted seat tracks 26 are reversibly securable to the associated floor beams 74 as depicted in FIGS. 5a and 5b so as to facilitate the lateral positioning of the galley 14. The floor beams 74, one shown in each figure, are generally T-shaped beams. The intercostals 76 are T-shaped beams having a vertical section 82 and a horizontal section 84 extending downwardly therefrom. A seat track 26 is secured to the center of the vertical section 82 above the horizontal section 84. The intercostal 76 also has a horizontally extending bottom flange 86 that extends perpendicularly to one side from the end of the horizontal section 84.

Each intercostal 76 is attached at opposed ends to a doubler 88 and a splicer 90 that is affixed to the adjacent floor beams 74. The doubler 88 has a base plate 92 that is welded or otherwise securely attached to the floor beam 74. A pair of identical, spaced-apart mounting flanges 94 integral with the base plate 92 extend perpendicularly outward from the base plate. The splicer 90 is an inverted L-shaped bracket that extends perpendicularly through a hole 96 formed in the floor beam and opposed doublers 88, between the mounting flanges 94. The splicer 90 is dimensioned to underlie the ends of the adjacent intercostal bottom flanges 86 and is welded or otherwise securely attached to the adjacent floor beam 74 and/or doublers 88. Fasteners 98 are used to secure the ends of the intercostal horizontal sections 84 to one of the doubler mounting flanges 94 and the intercostal bottom flanges 86 to the top of the splicer 90.

As represented by FIGS. 5a and 5b, the intercostal 76 is reversibly attachable to either of the doubler mounting flanges 94. When the intercostal 76 mounting is reversed, the centerline of the intercostal vertical section 82 and the seat track 26 thereon are laterally shifted around the centerline of the doubler 88-and-mounting bracket 90 subassembly. Thus, the lateral position of the galley 14 is adjusted by reversing the intercostals 74 which carry the seat tracks 26 to which the galley is secured.

Conventional fasteners, which are typically in the form of clamps or bolts (not illustrated), secure the seat tracks 26 across the laterally extending intercostals 76 in the wing box 78. The fasteners are adjustable so that the position of the seat tracks 26 can be laterally adjusted. Accordingly, should the galley 14 be mounted in the wing box 78, the position can be laterally adjusted by simply laterally shifting the associated seat tracks 26. Moreover, the laterally adjustable seat tracks 26 also make it possible to secure galleys 14 of differing widths to the cabin floor. When a wide-width galley is to be provided, the intercostals 76 can be shifted so that the seat tracks 26 are a maximum distance apart; narrow-width galleys can be secured by arranging the intercostals so that the seat tracks are separated by a minimum distance.

The floor fittings 60 and 62 are used to secure the galley 14 to any selected location along the length of the seat tracks 26. Each floor fitting 60 and 62 is designed to withstand specific acceleration forces to ensure that the galley 14 stays secured to the cabin floor 11 in the event the aircraft is subjected to massive acceleration forces. As depicted in FIG. 3, the galley 14 is provided with four of the floor fittings 60. Specifically, two floor fittings 60 are located in the galley rear wall panel 46, and one floor fitting 60 is located in each of the sidewall panels 44 in the portion of the panel adjacent the rear wall panel 46. There are two floor fittings 62, one located in the bottom of each galley sidewall panel 44 adjacent the open end of the galley 14.

Each floor fitting 60 includes a frame 110 that is attached to the galley wall panel 44 or 46. Each frame 110 defines a separate bolt space 112. The separate floor fittings 60 are each secured to an underlying seat track 26 by a conventional seat bolt 114 (FIG. 3a) or a modified seat bolt 115 (FIG. 3b) that extends through a bolt hole 118 formed in the base of the frame 110. Each floor fitting 60 is resistant to specific acceleration forces that depend on the seat bolt 114 or 115 used to secure the fitting.

Figure 3A:
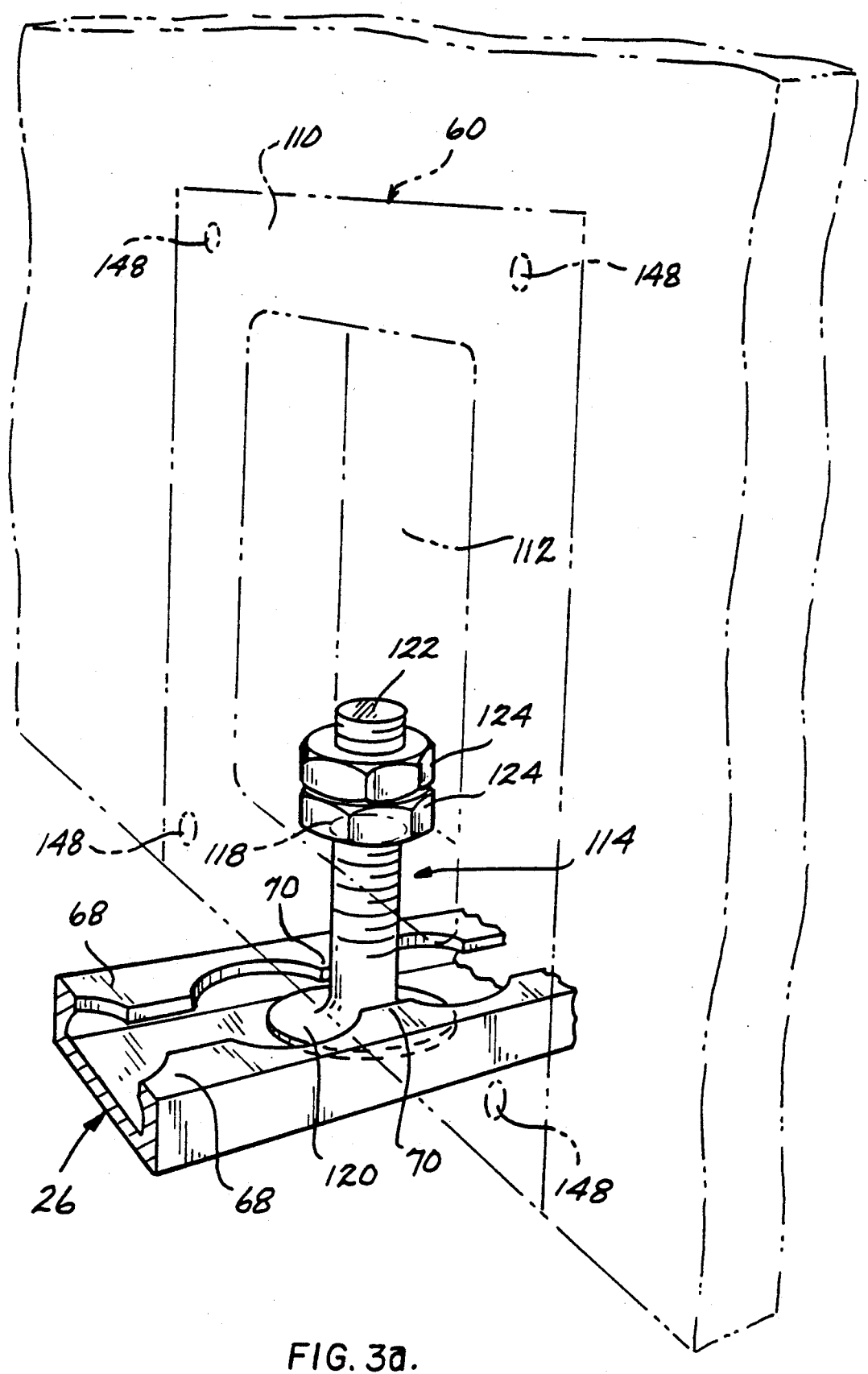
FIGS. 3a, 3b and 3c are cutaway views of the individual fittings of FIG. 3.

FIG. 3a depicts a conventional seat bolt 114 used to secure the floor fitting 60 to an underlying seat track 26. The seat bolt 114 has a head 120 that is located in the space between the seat track base 64 and the track flanges 68. The seat bolt 114 has a threaded stem 122 that extends from the bolt head 120 through the bolt hole 118 into the bolt space 112. The base of the bolt head 120 adjacent the stem 122 is planar. The floor fitting 60 is secured by two nuts 124 fastened to the seat bolt stem that urge the bolt head against the inner surfaces of a pair of opposed seat track flange lips 70.

The conventional seat bolt 114 secures floor fittings 60 to the seat track such that the fittings are primarily resistant to lateral or side forces. A conventional seat bolt 114 is used to secure one of the floor fittings 60 integral with the rear wall panel 46 such that the fitting is said to be primarily resistant to side-oriented acceleration forces.

Figure 3B:
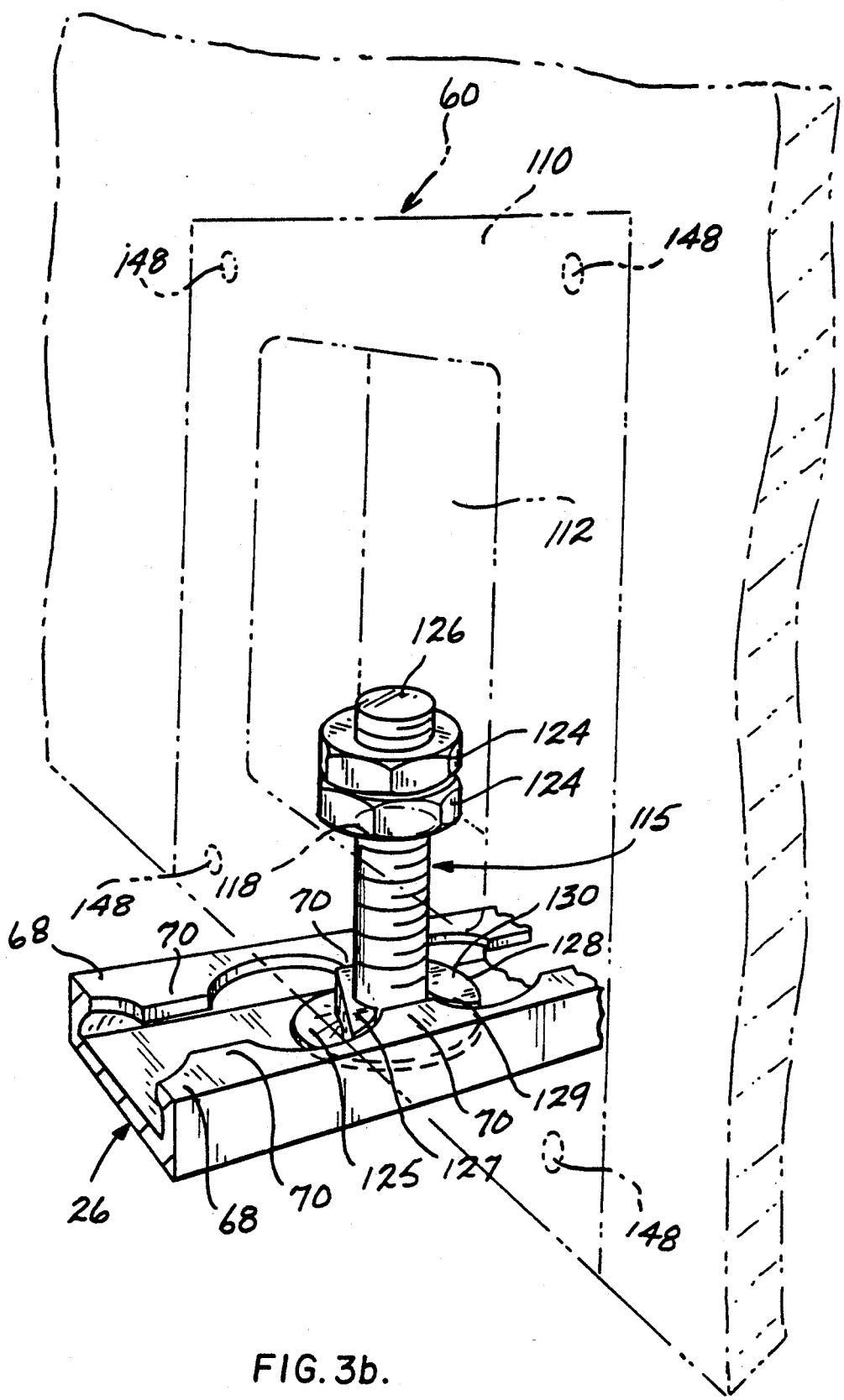

FIG. 3b depicts a modified seat bolt 115 used with the remaining floor fittings 60. The modified seat bolt includes a bolt head 125 located under a pair of opposed seat track flange lips 70. A threaded stem 126 extends upward from the bolt head 125 between the seat track flange lips 70. The bolt stem 126 is provided with a pair of opposed protuberances 127 and 128 which extend outward adjacent to where the stem is attached to the bolt head. The first protuberance 127 is directed toward the front of the fuselage 10 and the second protuberance is directed toward the rear of the fuselage. The first protuberance 127 has squared off edges and is generally dimensioned to fit in the space between opposed seat track flange lips 70 that is not occupied by the bolt stem. The second protuberance 128 has a first section 129 generally identical to the first protuberance. Integral with the second protuberance first section 129 is a second section 130 that is generally fan-shaped and dimensioned to fit into a portion of the bolt void 72 adjacent the flange lips 70 that overlie the bolt head 125. Nuts 124 are used to fasten the modified seat bolt to the floor fitting 60.

The protuberances 127 and 128 prevent forward movement of the modified seat bolt 115 such that the bolt is considered to be primarily resistant to forward-oriented acceleration forces. Thus, the two sidewall floor fittings 60 and one rear wall floor fitting 60 with which the modified seat bolt are used are considered to be primarily resistant to forward-oriented acceleration forces.

Figure 3C:
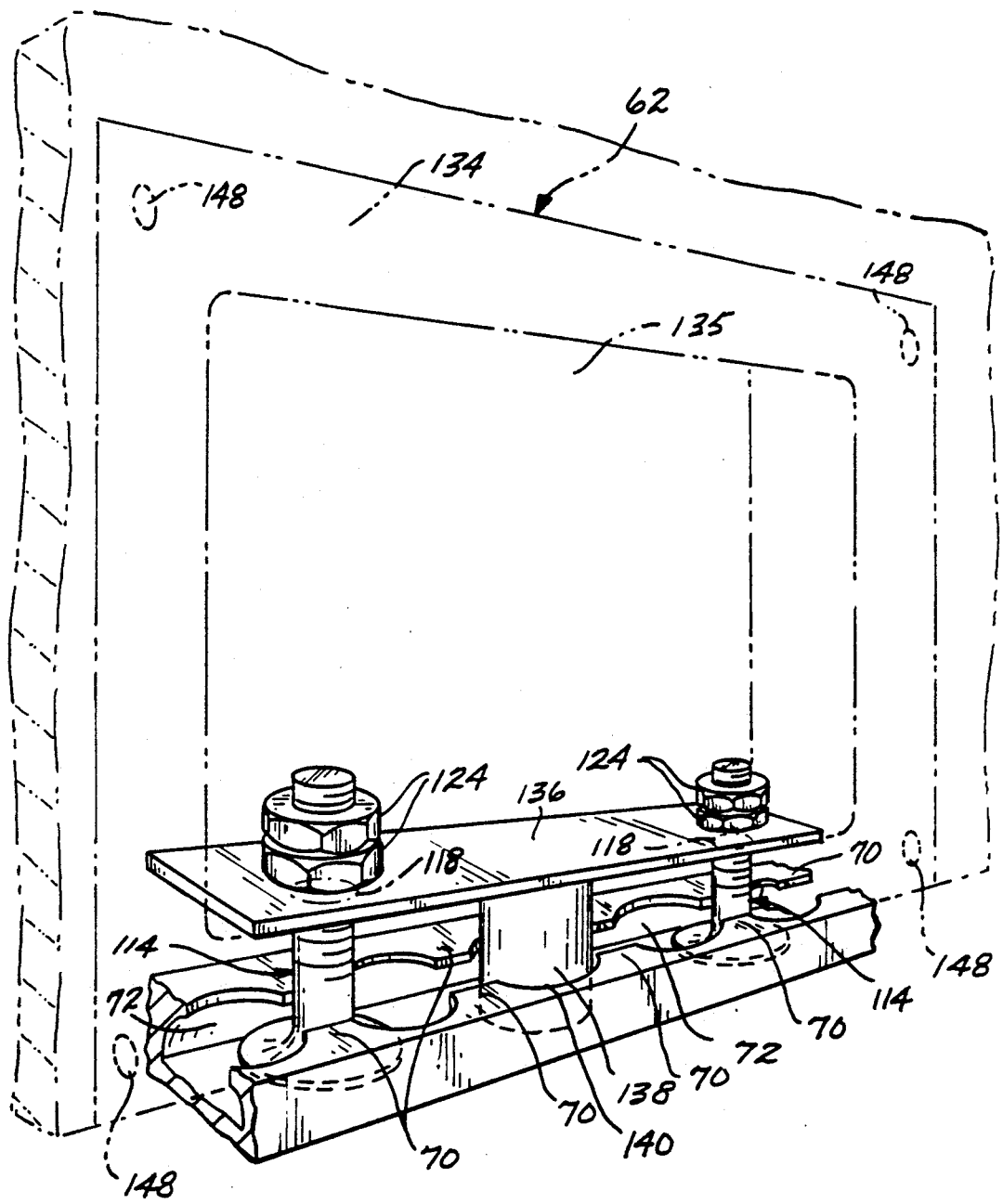

Each floor fitting 62, as depicted in FIG. 3c, includes a fitting frame 134 attached to the sidewall panel 44 which is similar to the fitting frame 110 of fitting 60 and which defines bolt space 135 similar to bolt space 112. A metal shear plate 136 is located in the bottom of the frame 134. A tube-shaped shear plunger 138 integral with the shear plate 136 extends through an opening 140 in the center of the frame 134 and into an underlying bolt void 72. The shear plate 136-and-shear plunger 138 assembly is secured to the frame 134 by a pair of conventional seat bolts 114 that extend through bolt holes 118 formed in the frame 134 on either side of the plunger hole, not shown and also formed in either end of the shear plate 136. The plunger hole and bolt holes 118 are spaced apart such that the seat bolt heads 120 underlie the opposed seat track flanges lips 70 that are adjacent the flange lips which define the bolt void 72 in which the plunger 138 is located. Two nuts 124 fastened to the seat bolts 114 over the shear plate 136 secure the plate-and-plunger assembly to the frame 134 and the fitting 62 to the seat track 26.

The twin conventional seat bolts 114 and shear plate 136 and shear plunger 138 make floor fitting 62 resistant to both forward and side-oriented acceleration forces. The galley 14 is thus secured to the cabin floor by floor fittings 60 and 62 that are resistant to side forces, forward forces, and both side and forward forces. Should the aircraft fuselage 10 be subjected to massive acceleration forces, one or more of the floor fittings 60 that are only resistant to a single type of force will initially shear or buckle. The initial fittings 60 to "break" will thus absorb a significant amount of the energy of acceleration. This reduces the stress on the other floor fittings 60 and 62 so that the galley will remain secured to the cabin floor 11.

Cover plates 144 (FIG. 3) attached to each of the fitting frames 110 and 134 enclose the bolt spaces 112 and 135. The cover plates 144 are attached to the fitting frames 110 and 134 by threaded fasteners 146 secured into threaded openings 148 in the frames. A kick plate 150 provides a cosmetic covering over the fittings 60 and 62 in each of the wall panels 44 and 46. The kick plates 150 are secured to the wall panels 44 and 46 by adhesives or other fastening means so that they can be readily removed and reinstalled as needed. The sections of the seat tracks 26 not covered by the galley wall panels 44 and 46 are covered by seat track plugs 151 inserted between the track flanges 68 for safety and aesthetic purposes.

Figure 6:
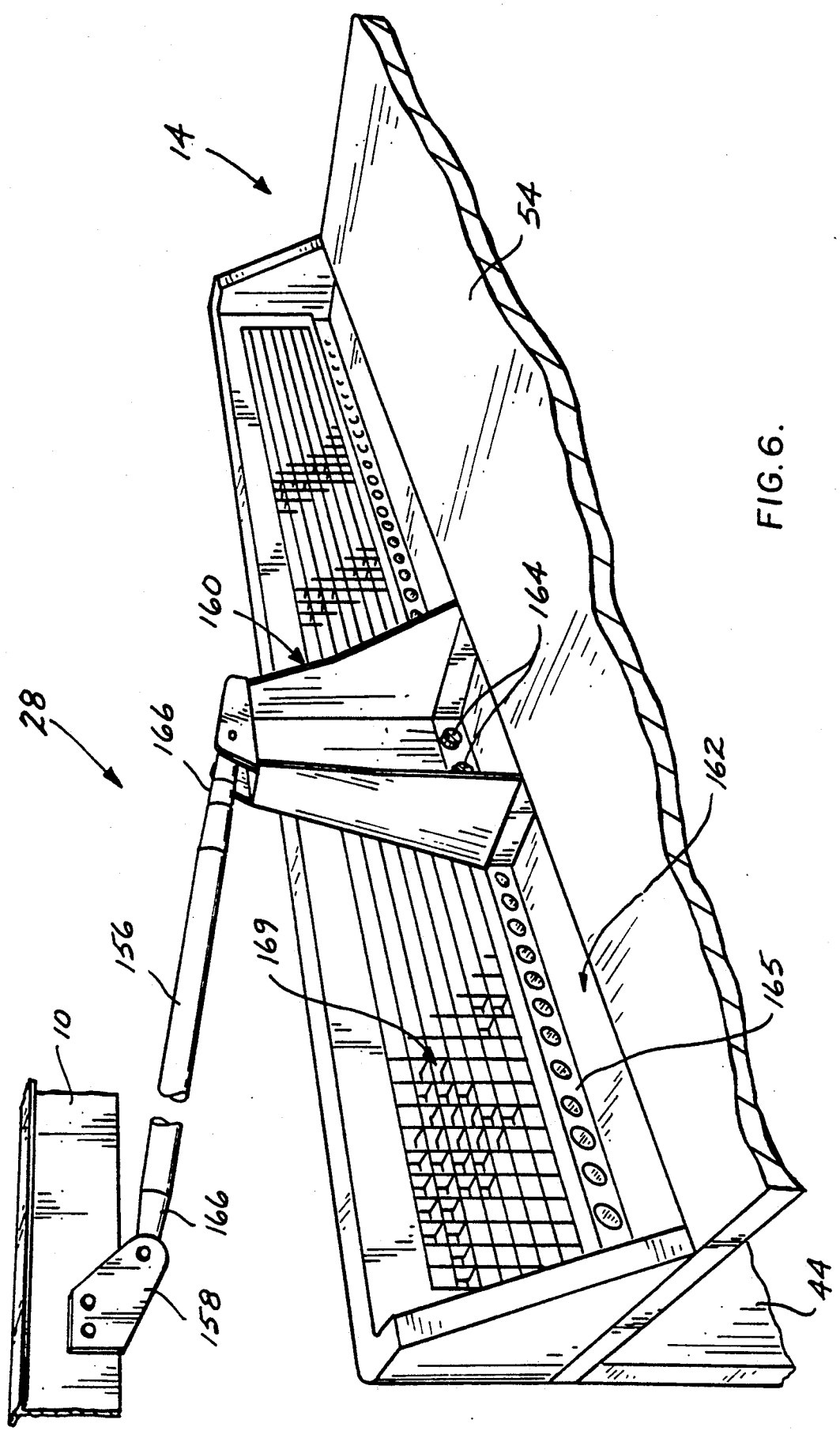
FIG. 6 is a perspective view of the overhead tie-down assembly used to secure the galley of FIG. 2.

Each tie-down assembly 28 used to secure the galley 14 to the top of the fuselage 10 includes a tie-down bar 156 as depicted in FIG. 6. The tie-down bar is connected between a frame fitting 158 attached to the top of the fuselage 10 and a tower 160 attached to the top of the galley 14. A number of frame fittings 158 are located along the length of the fuselage 10 so that wherever the galley 14 is located, there will be a nearby frame fitting to which the tie-down bar 156 can be attached. The tower 160 is mounted in a longitudinally extending recess 162 located along the lateral edge of the galley top panel 54. The position of the tower 160 in the recess 162 is longitudinally adjustable so that the tie-down bar 156 can be mounted to the galley 14 at a selected angle wherein the tie-down bar offers the maximum structural support. In one embodiment of the invention, the tie-down bar is intended to be mounted at an angle of 15° from the horizontal. Threaded fasteners 164 secure the tower 160 to a pair of horizontally oriented tracks 165, one shown, that extend longitudinally on the sides of the recess 162. Turn buckles 166 at the ends of the tie-down bar 156 are used to secure the bar to the frame fitting 158 and tower 160. The turn buckles 166 allow for lateral movement of the tie-down bar in instances where the galley's 14 position is laterally adjusted. A grill 169, mounted to the top of the galley top panel 54 outside of the recess 162, provides a cosmetic shield so that the tie-down assembly 28 is not visible.

Returning to FIG. 2, it can be seen that the electrical power cable 30, which supplies power to the galley 14, is attached to an inverted trough 170 that runs the length of the fuselage 10. The electric power cable 30 is attached to the trough 170 by a set of brackets 172, attached to the trough 170. The power is supplied to the galley 14 from the electric power cable 30 through one of a number of spaced-apart outlet sockets 174, one shown, which are connected to the cable and are attached to the brackets 172. Power is supplied to the galley 14 from a nearby outlet socket 174 through a flexible power cable 176 connected between the output socket and an input socket 178 in the galley top panel 54. The flexible power cable 176 has a cable head 180 with a threaded retaining ring that, in combination with complementary threading around the outlet socket 174, secures the cable 176 to the outlet socket. Conductors (not illustrated) in the galley rear and top panels 46 and 54, respectively, supply power to the galley electrical equipment.

Water is supplied to the galley 14 through the potable water line 32 which is located in the top of the fuselage 10 adjacent the inverted trough 170. Located along the potable water line 32 are a number of self-sealing outlet couplings 186. A flexible water line 188 is connected between the galley 14 and an adjacent water line coupling 186 to serve as a water conduit to the galley. The flexible water line 188 has an inlet head 190 that, in combination with complementary fastening members (not illustrated) on the outlet coupling 186 to which it is attached, actuates a valve (not illustrated) in the coupling that only allows water to flow through the coupling when the flexible water line is attached. The second end of the flexible water line 188 is connected to an inlet port 192 in the galley top panel 54. Water flows from the inlet port 192 into the faucet and sink 56 through a pipe (not illustrated) in the galley rear wall and top panels 46 and 54, respectively.

Air is vented from the galley 14 through the vent duct 34 which is attached to the top of the fuselage near the inverted trough 170. A number of inlet ducts 196 are located along the length of the vent duct 34. Air is exhausted from the galley 14 through a flexible hose 198 attached at one end to an outlet port 200 in the galley top panel 54 and at the other end to an adjacent inlet duct 196. The inlet ducts 196 are provided with valves (not illustrated) that are actuated either manually, or in response to the hose 198 being attached thereto, such that each inlet duct is only open when a hose 198 is attached thereto.

The galley 14 is provided with gasper air through gasper air line 36 which is mounted in the top of the fuselage 10 adjacent the inverted trough 170. Air outlets 202, with self-sealing valves (not illustrated), are located along the length of the gasper air duct 36. Gasper air is supplied to the galley 14 through a flexible air line 206 connected at one end to an adjacent air outlet port 202 and at the other end to an air inlet port 208 in the galley top panel 54. The outlet port valve is arranged so that the valve only opens when the air line 206 is attached thereto.

Waste water from the galley sink 56 is stored in the galley waste water system 38 which is located entirely within the galley 14. The galley waste water system 38 includes a collection pipe 210 which runs from the sink 56 and is secured to the counter 48 and the galley rear wall panel 46. The collection pipe 210 is connected to a gray water storage tank 212 located in a portable food storage cart 214 normally kept underneath the counter 48. Complementary couplings (not illustrated) on the pipe 210 and the cart 214 provide for fluid flow therebetween. A locking system (not illustrated) secures the cart 214 underneath the counter 48 so that the cart does not move while the aircraft is in flight. The storage tank 212 is provided with a drain 216 so that the tank can be emptied whenever the cart 214 is removed from the aircraft for restocking.

Figure 7:
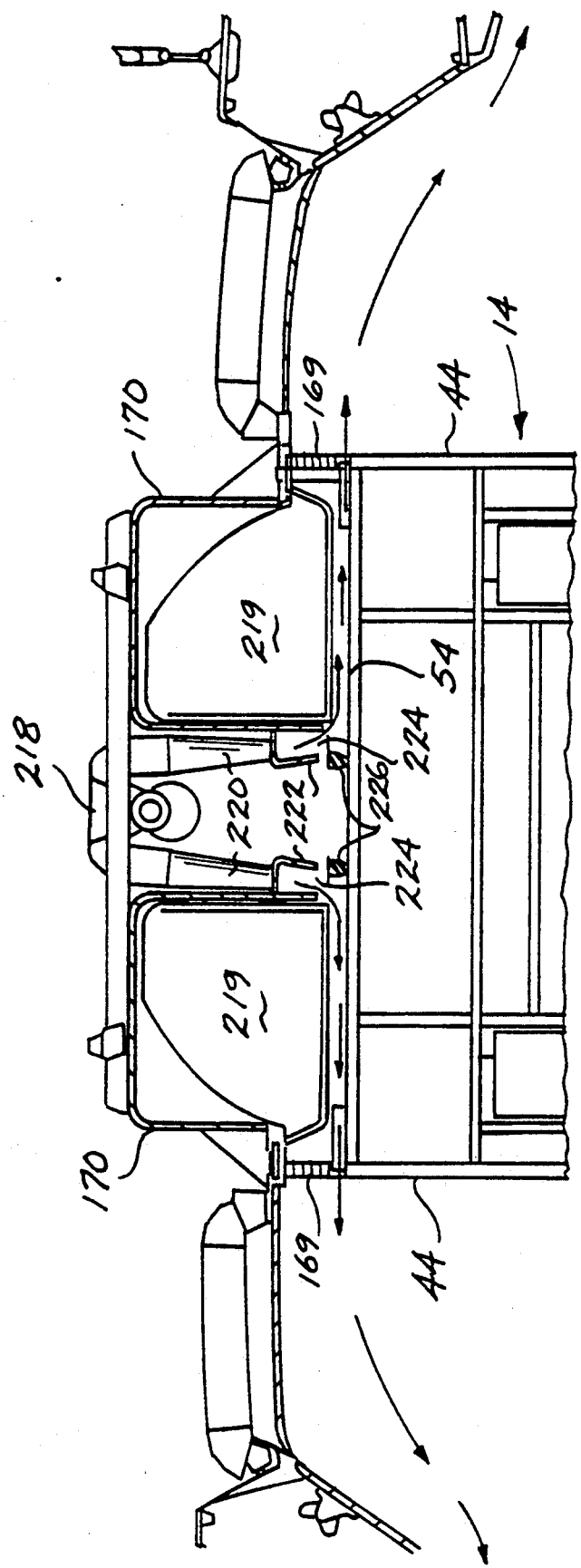
FIG. 7 is a cross-sectional view of a portion of the aircraft fuselage illustrating the air conditioning air flow around the galley according to this invention.

As illustrated in FIG. 7, the galley 14 does not interfere with the normal distribution of air from the air conditioning ducts 218 located in the top of the fuselage 10. The galley 14 is dimensioned to fit below overhead storage bins 219 that are secured in the inverted troughs 170. Prior to the galley 14 being moved to an intended location, a ceiling panel (not illustrated) between the storage bins 219 is removed. Removal of the ceiling panel exposes the open end of the air conditioning duct outlet branch 220 through which air from the air conditioning duct 218 is distributed. A plenum 222 is attached to the open end of the air conditioning duct 220 and the end of one of the adjacent troughs 170 to slow the discharge of air out of the air conditioning duct. The plenum 222 has an opening 224 adjacent the end of the inverted trough 218 through which air is normally discharged from a vent in the ceiling panel. The plenum is also provided with a bulb seal 226 spaced away from the inverted trough 218 and the plenum opening 224 which abuts the galley top panel 54. The bulb seal 226 directs the discharge of air out of the plenum opening 224 so that the air flows laterally across the top of the galley top panel 54 and out through the grill 169 and into the fuselage 10 adjacent the side of the galley 14.

Figure 8:
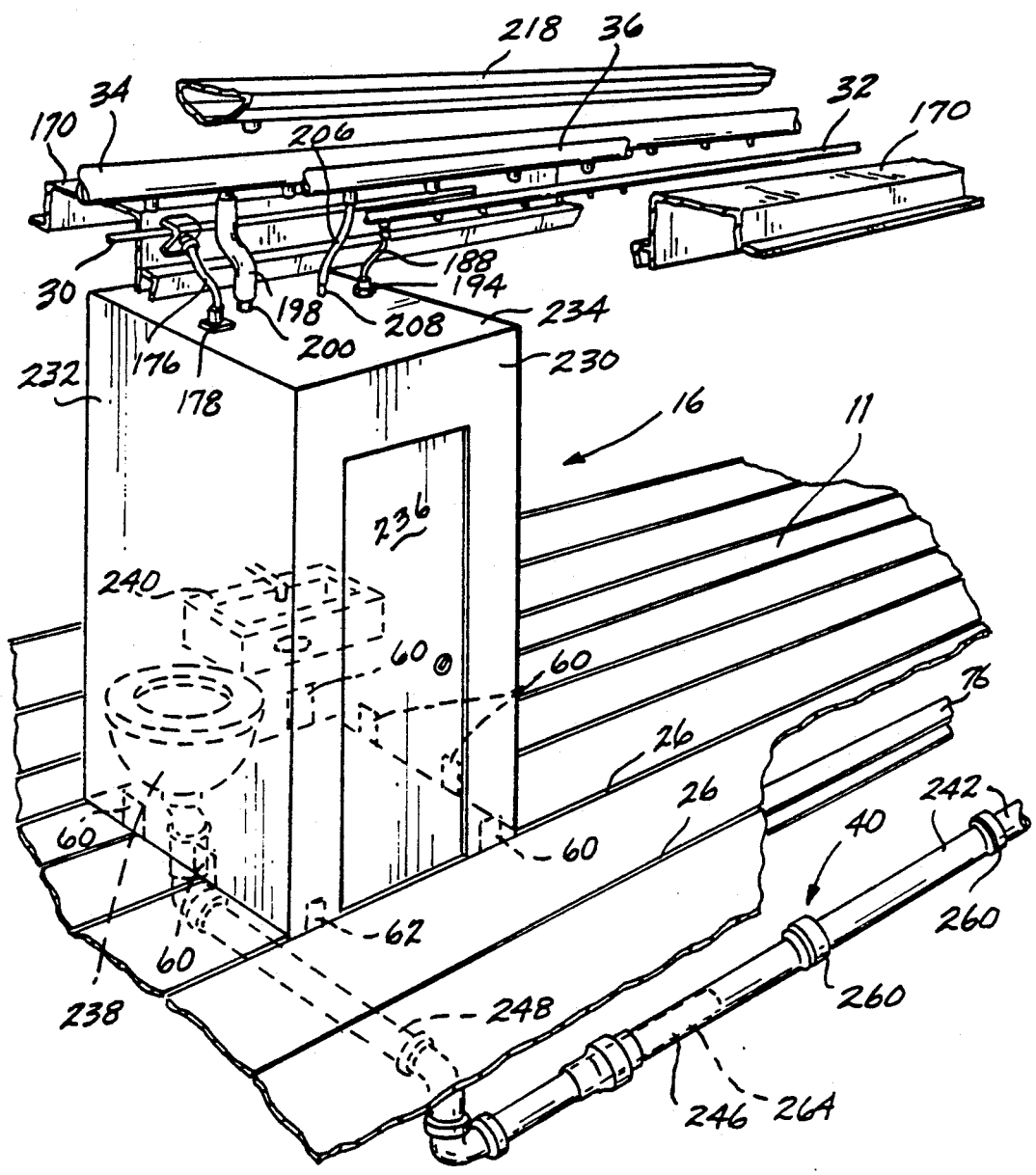
FIG. 8 is a perspective view of the centerline lavatory unit of the aircraft cabin system of this invention.

The centerline lavatory 16, as shown in FIG. 8, is an enclosed compartment formed by two longitudinally extending wall panels 230, two laterally extending wall panels 232 and a top panel 234. Access into the lavatory 16 is through a door 236 attached to one of the longitudinal wall panels 230. The lavatory 16 is equipped with a bowl 238 adjacent one of the corners formed by the longitudinal wall 230 and the lateral wall 232 opposite the door 236. A sink 240 is attached to one of the lateral walls 232 adjacent the bowl 238.

The lavatory 16 is selectively secured to any location along the seat tracks 26 in the cabin floor 11 by floor fittings 60 and 62 located in the bottom of the lavatory wall panels 230 and 232. As with the galley 14, the floor fittings 60 and 62 are each intended to withstand a specific set of acceleration forces. Two longitudinally aligned floor fittings 60, one in each lateral wall panel 232, are provided that are primarily resistant to side forces. Two longitudinally aligned floor fittings 60, one in each of the lateral wall panels 232, are provided that are primarily resistant to forward forces. Two laterally aligned floor fittings 60, one in each of the longitudinal wall panels 230, are provided that are resistant to forward acceleration forces. The longitudinal wall panels 230 are also each provided with a floor fitting 62. The fittings 62 are laterally aligned, and are resistant to both forward and side acceleration forces. This fitting arrangement, like the fitting arrangement used to secure the galley 14, ensures that should the fuselage 10 be subjected to significant acceleration forces, the lavatory 16 will remain secured to the cabin 11.

A foldable flight attendant's seat (not illustrated) may be attached to the outside of either of the lavatory lateral wall panels 232. When a flight attendant's seat is provided, the lavatory 16 is secured to the top of the fuselage 10 by a pair of tie-down assemblies 28, not illustrated in this embodiment of the invention. If a flight attendant's seat is provided, the location of the individual floor fittings 60 and 62 may be changed in order to ensure that galley 14 will stay secured to the cabin floor 11.

Electricity, water, ventilation and air are provided to the lavatory 16 through the electrical power cable 30, the waterline 32, the vent duct 34 and the gasper air line 36. The lavatory top panel 234 is provided with an electrical input socket 178, a water inlet port 194, a ventilating air outlet port 200, and a gasper air inlet port 208 so that the service connections can be made to the lavatory 16. A flexible power cable 176, a flexible water line 188, a flexible vent hose 198 and flexible gasper air inlet line 206 described with reference to the galley 14 serve as the conduits for the connection of services to the lavatory 16.

Waste from the lavatory bowl 238 and sink 240 is collected through the lavatory waste collection system 40. The collection system 40 includes a set of modular pipe sections 242 that run longitudinally underneath the cabin floor 11. The pipe sections 242 start at a pump 244 (FIG. 1), adjacent the holding tanks 42 which draws waste through the collection system 40 into the holding tanks. The pipe sections 242 are assembled to be of sufficient length so that the open end of the lead pipe section 242 is located in the vicinity of the lavatory 16. Attached to the open end of the lead pipe section 242 is a telescoping pipe section 246 that is adjusted so that the open end of the telescoping section is in line with the lavatory 16. Attached to the forward opening of the telescoping pipe section 246 is a transverse pipe 248 that extends laterally under the cabin floor 11 and terminates under the lavatory bowl 238. If it is intended that the position of the centerline lavatory can be laterally adjusted, the transverse pipe 248 may be provided with a telescoping section (not illustrated) so that the length of the pipe can be adjusted as required.

Figure 9B:
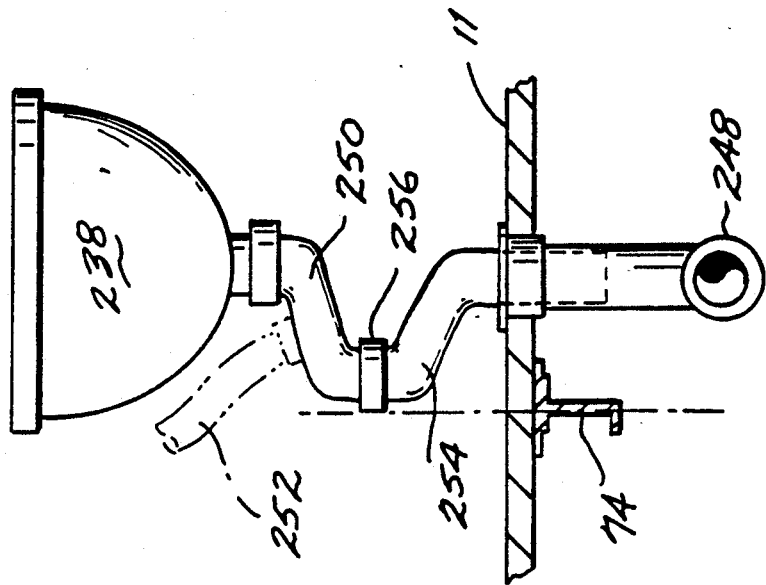
FIG. 9 is a diagrammatic depiction of how the lavatory bowl is connected to the lavatory waste collection system.
Figure 9A:
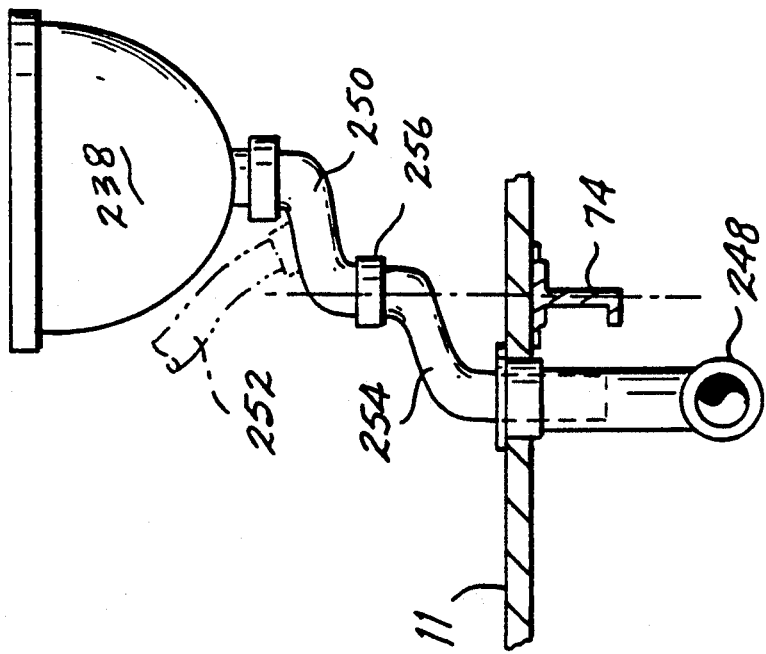

As shown diagrammatically in FIGS. 9a and 9b, the lavatory bowl 238 is connected to an outlet elbow 250. Waste water from the lavatory sink 240 (FIG. 8) flows through a collection pipe 252 which is connected to the outlet elbow 250. The outlet elbow 250 is connected to the collection system transverse pipe section 248 by an offset elbow 254 which extends through the cabin floor 11. The outlet elbow 250 and the offset elbow 254 are connected together by a vacuum-tight coupling assembly 256 that allows the offset elbow 254 to be mounted to the outlet elbow in at least two positions. This facilitates the coupling of the outlet elbow to the transverse pipe 248 in situations where the outlet elbow opens over an underlying floor beam 74. In these situations, the telescoping pipe section 246 (FIG. 8) can be adjusted such that the transverse pipe section 248 is positioned either immediately forward or aft of the floor beam 74. The offset elbow 254 can then be positioned to interconnect the bowl outlet elbow 250 to the transverse line 248 around either side of the floor beam 74.

Figure 10:
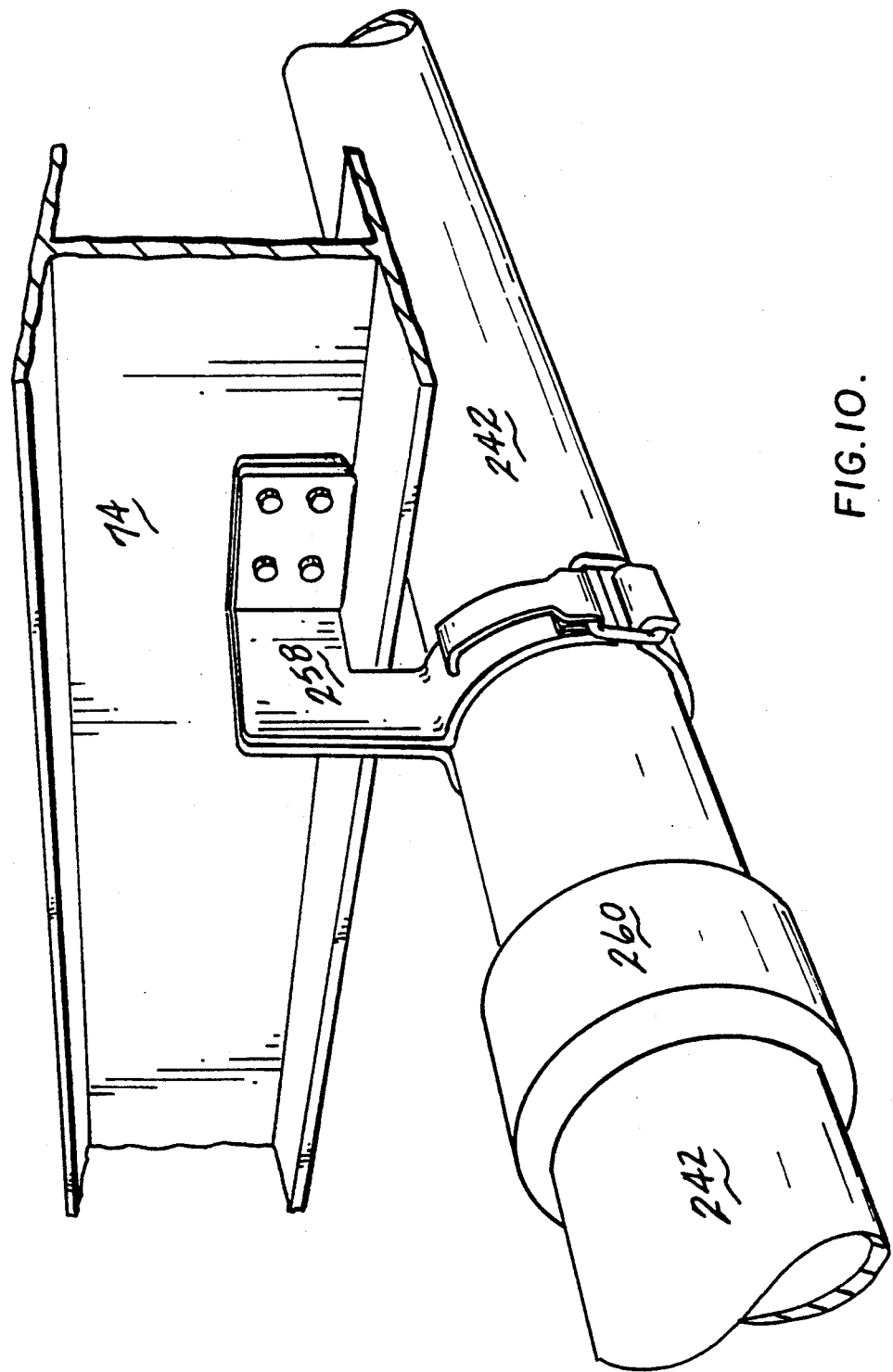
FIG. 10 is a perspective view of how the modular pipe sections are secured underneath the floor beams of the aircraft according to this invention.

As shown in FIG. 10, the pipe sections 242 are secured underneath the floor beams 74 by brackets 258 attached to the floor beams. The brackets 258 releasably secure the pipe sections 242 to the floor beams 74 so that when the lavatory 16 is moved forward, additional pipe sections can be installed, and when the lavatory is moved rearward, pipe sections can be removed. The individual pipe sections 242 are coupled together by a clamp 260 such that when pipes are connected together, a vacuum-tight seal is formed.

Figure 11:
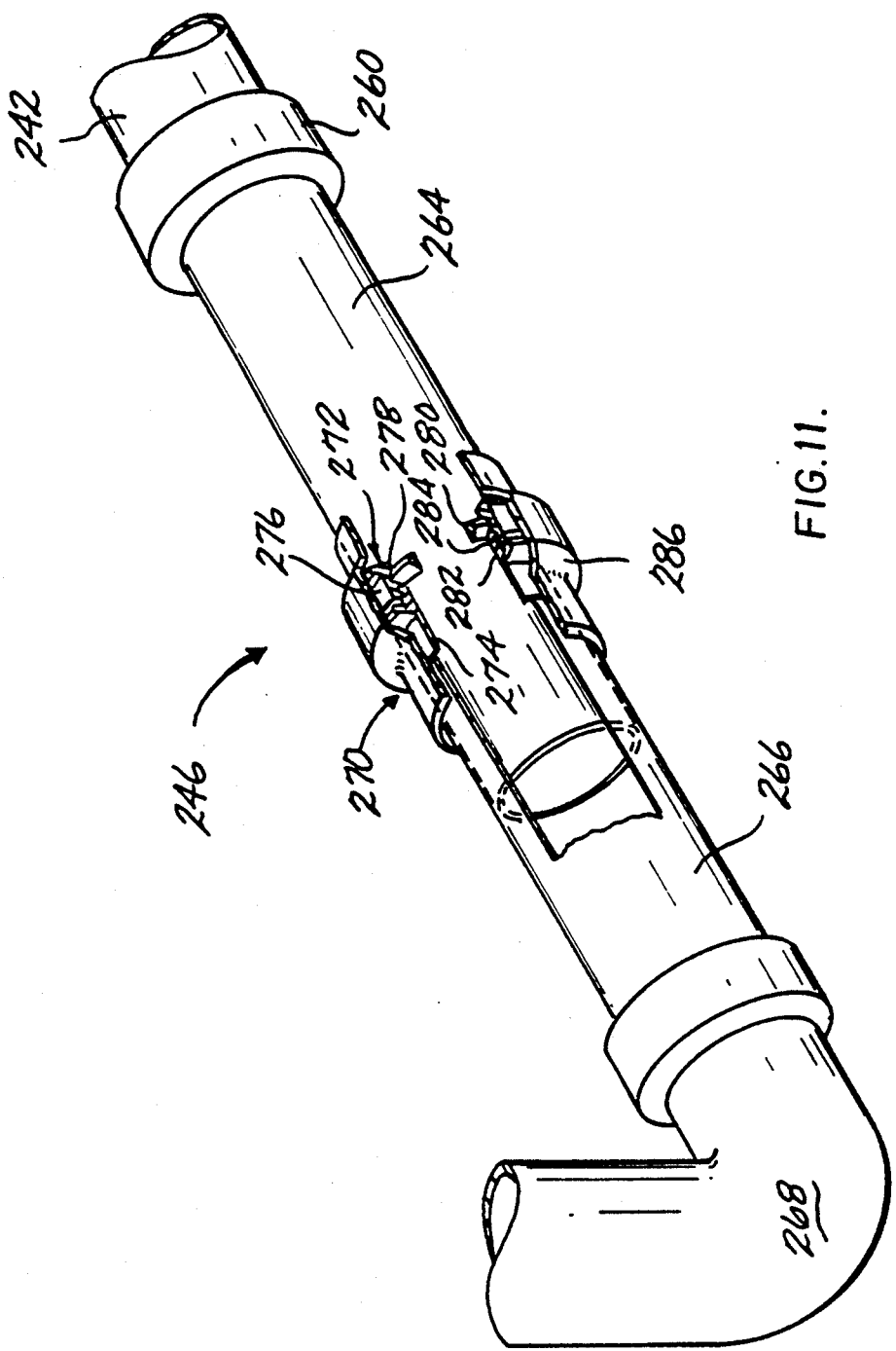
FIG. 11 is a detailed view of a telescoping pipe section of the lavatory waste collection system of this invention.

The telescoping pipe section 246 has an inner tube 264 and an outer tube 266 that is adjustably slid over the inner tube as illustrated in FIG. 11. A clamp 260 is located around the open end of the inner tube 264 for attaching the telescoping section 246 to the open end of the lead pipe section 242. The open end of the outer tube 266 is provided with an elbow section 268 for attachment to the transverse line 248 (FIG. 8).

A compression seal assembly 270 is used to form a vacuum-tight seal between the inner tube 264 and the outer tube 266. The compression seal assembly 270 includes a nut compression seal 272 slidably disposed around the inner tube 264 and a housing compression seal 274 attached to the end of the outer tube 266. The nut compression seal 272 has a body 276 adjacent the housing compression seal 274 spaced away from the inner tube 264, and a lip section 278 integral with the body, that abuts the inner tube. An annular compression seal 280 with a triangular cross section is located around the inner tube 272 between the nut compression seal body 276 and the lip section 278. Complementary threading 282 around the outside of the housing compression seal 274 and the inside of the nut compression seal body 276 secure the nut compression seal and the housing compression seal together. When the nut compression seal 272 and housing compression seal 274 are so attached, the compression seal 280 is compressed between the nut compression seal lip section 278 and the end of the housing compression seal which is formed with an outwardly directed taper 284. The compression urges the seal 280 against the inner tube 272 so as to form a vacuum-tight barrier between the inner and outer tubes. After the seal has been formed, a rubber shrink tube 286 is placed over the nut compression seal 272 and housing compression seal 274 to protect against any failures in the compression seal and to prevent the seal assembly from unscrewing.

Figure 12:
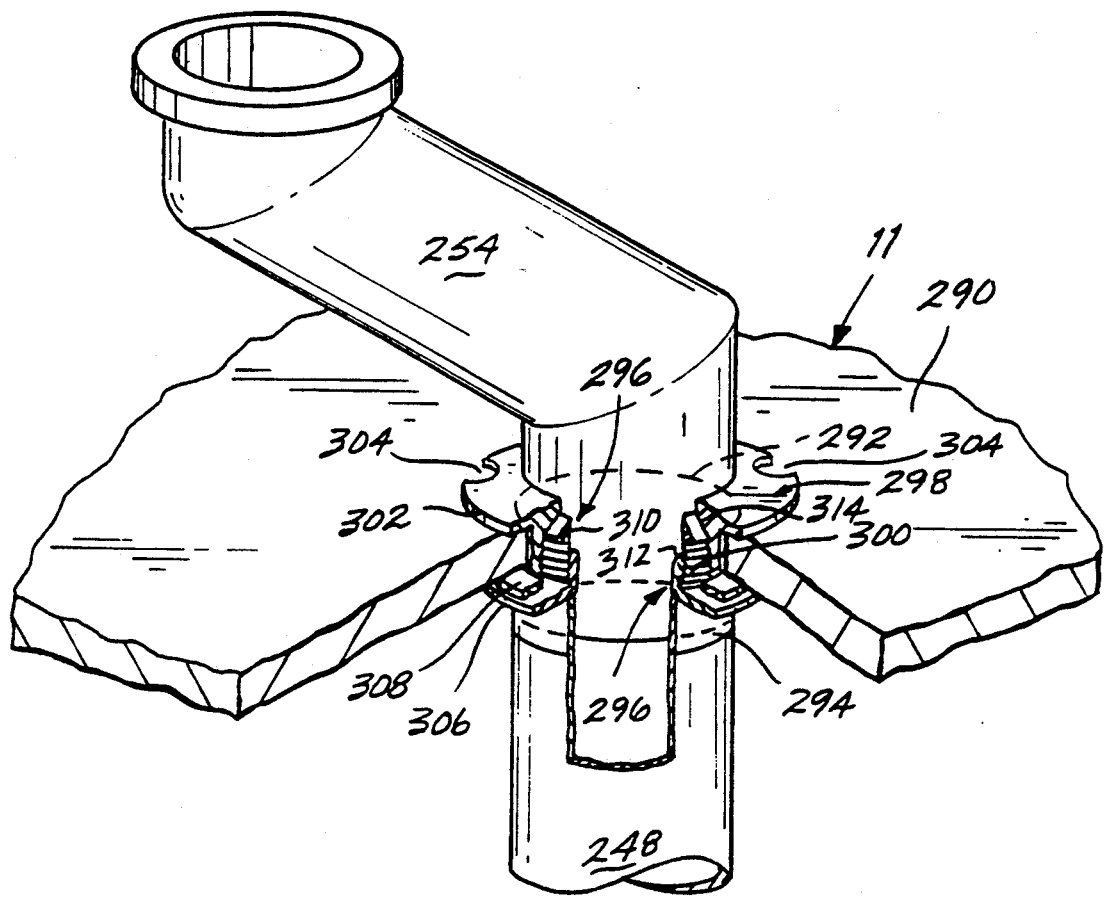
FIG. 12 is a detailed view of how the offset elbow of the lavatory bowl is connected to a transverse pipe section of the lavatory waste collection system of this invention.

As illustrated in FIG. 12, the lavatory offset elbow 254 is connected to the transverse pipe section 248 through a floor panel 290 that forms part of the cabin floor 11. The offset elbow extends through a hole 292 formed in the floor panel 290 and is connected into an elbow extension 294 at the end of the transverse line 248. The floor panel 290 is removable such that when the lavatory 16 is repositioned, the floor panel with the hole 292 to accommodate the offset elbow can be repositioned underneath the area in which the lavatory will be located. It may be desirable to provide the floor panel 290 with a number of holes 292 so that regardless of where the lavatory 16 is relocated there will always be a hole 292 through which the offset elbow 254 can extend. In a multihole 292 floor panel 290, the holes through which the offset elbow 254 does not extend, are covered by plugs (not illustrated).

A compression seal assembly 296 is used to vacuum seal the offset elbow 254 to the transverse pipe elbow extension 294. The compression seal assembly 296 includes an annular nut seal 298 ring that is seated in the floor panel hole 292 around the outside of both the offset elbow 254 and the transverse line elbow extension 294. Complementary threading 300 on the outside of the elbow extension 294 and on the inside of the nut seal ring 298 is provided so that the ring can be secured to the elbow extension. An annular flange 302 is located around the outside of the nut seal ring 298 above the floor panel 290. Indentures 304 are formed in the flange 302 so that the nut seal ring 298 may be secured to the elbow extension 294 by a complementary wrench (not illustrated). The transverse type elbow extension 294 is provided with an annular flange 306 immediately below the threading 300. A resilient annular bushing 308 is attached to the flange 306 adjacent the threading 300.

The compression seal assembly 296 also includes an annular compression seal 310 that has a triangular cross section which is located around the offset elbow 254 adjacent the open end of the transverse pipe elbow extension 294. The compression seal 310 is located in a space defined by an indenture 312 in the nut seal ring adjacent the offset elbow 254 above the threading 300, and by offset taper 314 formed around the open end of the elbow extension 294. When the nut seal ring 298 is secured to the elbow extension 294, the compression seal 310 is compressed into the space between the offset elbow 254 and the open end of the elbow extension 294 so as to form a vacuum-tight seal. The flange 306 and bushing 308 located around the elbow extension 294 below the threading 300 limit the downward movement of the nut seal ring 298. The flange 306 and bushing 308 also dampen the transmission of motion between the transverse line 248, the floor panel 290 and offset elbow 254 that occurs due to the normal in-flight vibration of the fuselage 10.

Figure 13:
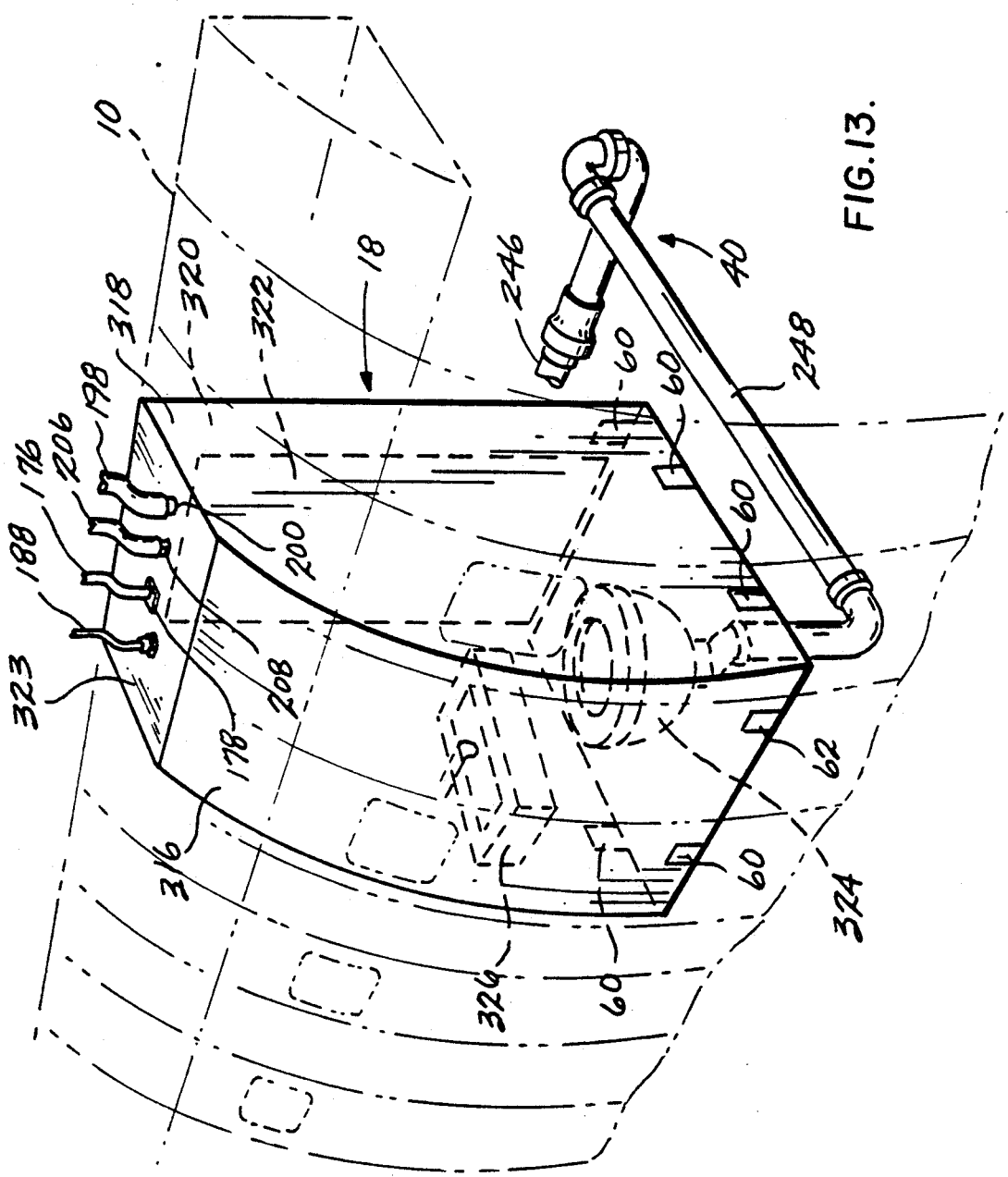
FIG. 13 is a perspective view of the sidewall lavatory of this invention.

The sidewall lavatory 18, as depicted in FIG. 13, is a closed compartment formed out of the first longitudinally aligned wall panel 316, with curvature conforming to the curvature along the inside of the fuselage 10, a pair of laterally extending wall panels 318, and a second longitudinal wall panel 320 with a door 322. The lavatory 18 is enclosed by a top panel 323. The lavatory 18 is provided with a lavatory bowl 324 in one of the corners between the first longitudinal wall panel 316 and one of the adjacent lateral wall panels 318 and a sink 326 attached to the lateral wall panel 318 adjacent the bowl.

The lavatory 18 is secured to seat tracks 26 (FIG. 3) in the underlying cabin floor 11. As with the galley 14 and centerline lavatory 16, the floor fittings 60 and 62 fastening means used to secure the associated seat tracks, are selected such that each fitting and associated seat track 26 are said to be resistant to a specific set of acceleration forces. Specifically, two longitudinally-aligned floor fittings 60, one in each lateral wall panel 318, are provided that are primarily resistant to side-oriented acceleration forces. Two longitudinally aligned floor fittings 60, one in each lateral wall panel 318, are provided that are primarily resistant to forward acceleration forces. Each longitudinal wall panel 316 and 320 has a floor fitting 60 and a floor fitting 62 such that the fittings 60 are laterally aligned with each other and the fittings 62 are laterally aligned with each other. The floor fittings 60 are primarily resistant to forward-oriented acceleration forces. The floor fittings 62 are resistant to both forward and side-oriented acceleration forces. As in the previous assemblies, this construction insures that should the fuselage 10 be subject to massive acceleration forces, the sidewall lavatory 18 will remain secured to the cabin floor 11.

Figure 14:
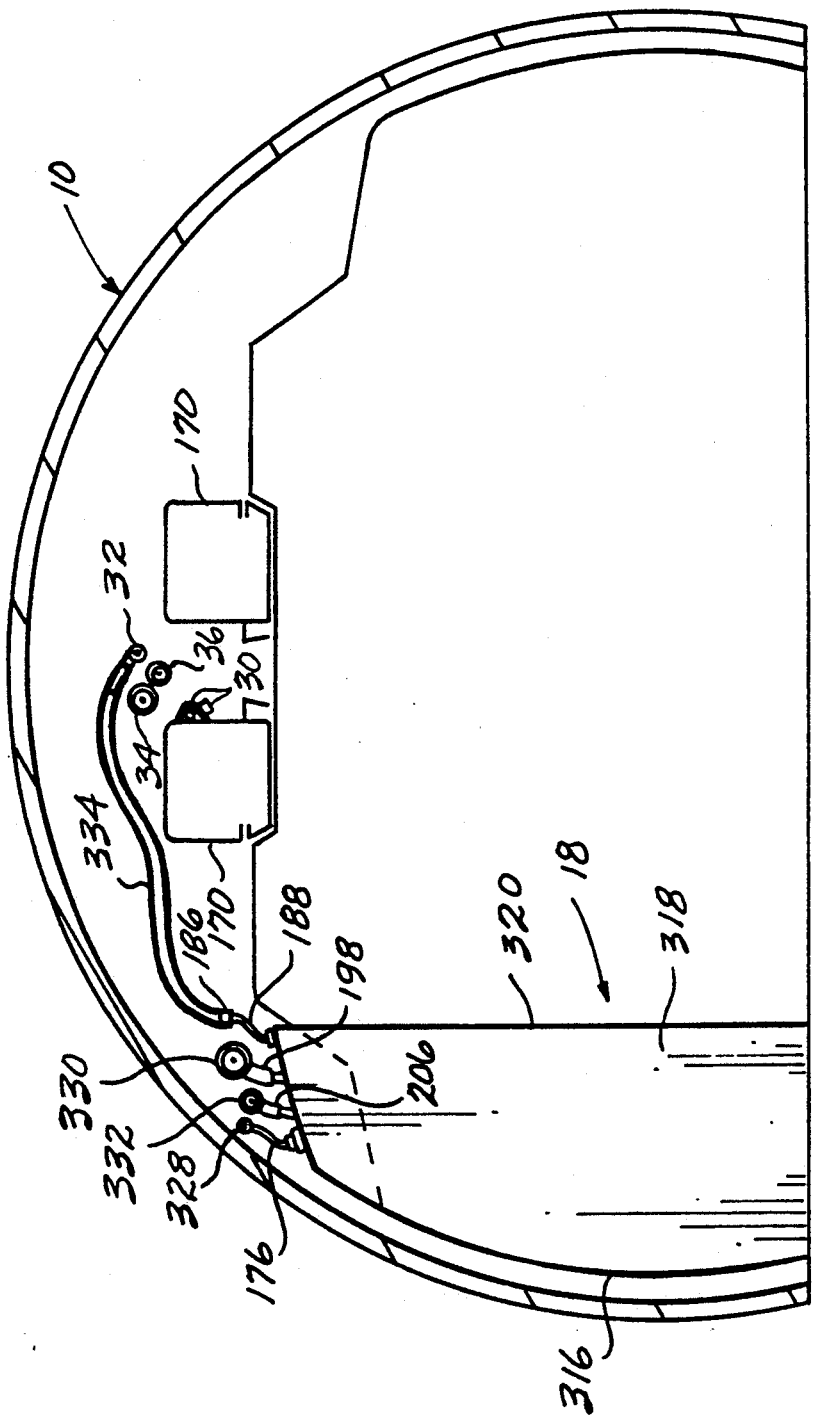
FIG. 14 is a schematic view showing the service connections to the sidewall lavatory.

As depicted diagrammatically in FIG. 14, the sidewall lavatory 14 is supplied with electrical ventilation and air services through an electrical supply line 328, a ventilating air duct 330, and a gasper air duct 332 located in the top of the fuselage 10. The electrical power line 328, the vent duct 330, and gasper air line 332 are identical to the previous in function to the electrical power cable 30, the vent duct 34 and the gasper air line 36 and are already in the aircraft fuselage 10 for supplying services to passengers in the seats along the side of the fuselage. The electrical power cable 328, the ventilating duct 330, and the gasper air line 332, are respectively provided with the previously described electrical outlet sockets 174, ventilating inlet ducts 196, and gasper air outlet ports 202 so that the sidewall lavatory 16 can be provided with services regardless of where it is located. Connections of the services to the sidewall lavatory are through a flexible power cable 176, a flexible ventilation hose 198, and a flexible air line 206, which have been previously described. The sidewall lavatory top panel 323 (FIG. 13) is provided with a necessary electrical socket 178, ventilating air out port 200 and gasper air inlet port 208 so that the service connections can be made to the lavatory.

A number of spaced-apart, laterally extending branch water lines 334, one shown, extend from the water line 32 so that the sidewall lavatory 18 can be supplied with water. The branch water lines 334 extend off the water line 32 and are spaced apart longitudinally throughout the fuselage 10 so that wherever the lavatory 18 is moved, there will be a nearby source of water. The end of each branch water line 334 is provided with a self-sealing outlet coupling 186 so that a flexible water line 188 can be connected thereto. A flexible water line 188 is used as the conduit through which the water can flow from branch water line 334 adjacent the lavatory 18 into the lavatory through an inlet port 194 in the lavatory top panel 323.

Waste water from the lavatory bowl 324 and sink 326 is collected by the lavatory waste collection system 40 for storage in the holding tanks 42 (FIG. 1). As described with respect to the centerline lavatory 16, the collection system 40 includes a number of pipe sections 242, 246 and 248 that are coupled to an offset elbow 254 through which waste from the bowl 324 and sink 326 flows. The specific modular pipes 242, telescoping pipe 246 and transverse pipe 248 which are connected to the sidewall lavatory may, of course, be of different length than the pipes that are connected to the centerline lavatory 16.

Adjacent the top of the sidewall lavatory are overhead storage bins 336 or 338, or a literature rack 340 as depicted in FIGS. 15a-f. Specifically, as can be seen in FIG. 15a, the sidewall lavatory is significantly shorter in length than the standard movable overhead storage bin 336. For example in one configuration, the overhead storage bin 336 is eight-eight inches long and the lavatory 16 is thirty-eight inches long. The "empty" space in a standard overhead storage bin location not filled by the sidewall lavatory 18 is occupied by a pair of reduced size storage bins 338 and the literature rack 340. The reduced size overhead storage bins are twenty-two inches long and the literature rack is six inches long. Cumulatively, the reduced size overhead storage bins 338 and literature rack 340 measure fifty inches in length which is identical to the section of length in a standard overhead storage location which is not occupied by the lavatory 18.

The overhead storage bins 336 and 338 and literature rack 340 are releasably attached to the fuselage 10 using a known mounting system. The sidewall lavatory 18 can thus be repositioned by moving the overhead storage bins 336 and 338 and literature rack 340 as desired. As depicted by FIGS. 15a-f, within any longitudinal area occupied by a standard overhead storage bin 336, the lavatory 18, the reduced sized storage bins 338 and literature rack can be arranged to present an uninterrupted view along the fuselage 10. Specifically, as depicted in FIG. 15a, the units can be positioned in a lavatory-literature rack-bin-bin arrangement wherein the lavatory is aligned against a baseline position adjacent a standard overhead storage bin 336. As depicted in FIG. 15b, the lavatory can be positioned six inches from the baseline position using a literature rack-lavatory-bin-bin arrangement. Using the bin-lavatory-literature rack-bin arrangement of FIG. 15c, the lavatory can be positioned twenty-two inches from the baseline position. With the bin-literature rack-lavatory-bin arrangement of FIG. 15d, the lavatory can be positioned twenty-eight inches from the baseline position. The lavatory 18 is located forty-four inches from the baseline position in the bin-bin-lavatory-literature rack arrangement of FIG. 15e. Alternatively, the lavatory 18 can be positioned fifty inches from the baseline position using the bin-bin-literature rack-lavatory arrangement of FIG. 15f.

If the sidewall lavatory 18 is to be positioned outside of the initial standard storage bin location, the adjacent standard overhead bins 336 are removed and the lavatory is relocated as desired. The displaced standard overhead bin 336 is reattached in the location originally occupied by the lavatory 16, and the reduced size overhead storage bins 338 and the literature rack 340 are reattached adjacent the relocated lavatory 18.

The aircraft cabin system 12 of the invention allows aircraft galleys 14 and lavatories 16 and 18 to be relocated in any number of locations in an aircraft fuselage 10 with minimal effort. The floor fittings 60 and 62 and tie-down assemblies 28 allow the galley 14 and lavatories 16 and 18 to be quickly secured to and released from any location in the aircraft where the complementary seat tracks 26 and fuselage fittings 158 are located. The positions of the galley 14 and centerline lavatory 16 can be laterally adjusted by shifting the seat tracks 26. Electrical, water ventilation and air services can similarly readily be connected and disconnected to the galley and lavatory at any location where the units are positioned.

Galley waste water is conveniently stored in the gray water storage tank 212. This eliminates the need to provide under floor waste collection connections each time the galley 14 is moved. The flexibility of the lavatory waste collection system 40 facilitates connecting the lavatories 16 and 18 to the holding tanks 42 when the positions of the lavatories are changed.

The reduced size overhead storage bins 338 and literature rack 340 mounted adjacent the sidewall lavatory 18 offer an aesthetically pleasing uninterrupted appearance of the overhead space in the vicinity of the lavatory. The bins 338 and literature rack 340 also maximize the usefulness of the space in the vicinity of the lavatory 18.

The system 12 of this invention maximizes the flexibility of where aircraft galleys 14 and lavatories 16 and 18 can be located. The system 12 thus allows an aircraft owner to readily reposition these units for almost any desired cabin reconfiguration. Moreover, the flexibility offered by the system 12 eliminates the need for an aircraft owner to have to specify where galleys 14 and lavatories 16 and 18 are to be located when the aircraft is being built.

Figure 16:
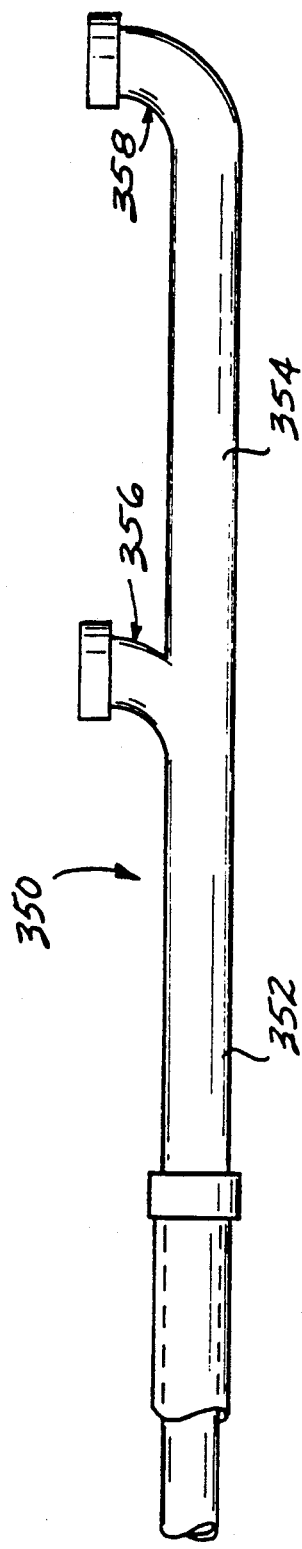
FIG. 16 is a general view of an alternative transverse pipe section that may be used in alternative embodiments of this invention.

It is of course understood that this specification is exemplary and that other support and interconnect assemblies may be used with this aircraft system 12 without departing from the scope of the invention. FIG. 16, for example, depicts an alternative transverse pipe section 350 that may be part of the lavatory waste collection section. The transverse pipe section 350 has a telescoping length section 352 and a fixed length section 354. The fixed length section 354 has a first elbow opening 356 adjacent the telescoping section 352 and a second elbow opening 358 at the opposite end. The two openings 356 and 358 enable the transverse pipe section 350 to be connected to two separate bowels in a two-compartment lavatory unit. The telescoping section 352 enables the length of the transverse pipe section 350 to be adjusted should the position of the lavatory unit be laterally offset.

It is also understood that disclosed constructions of the galley 14 and lavatories 16 and 18 are similarly illustrative. In some embodiments of the system, for example, it may be desirable to provide a privacy panel spaced a small distance in front of the open end of the galley 14. Moreoever, it is clear that the galley 14 can be provided with a front wall panel and open to the rear if such configuration is desired.

Fastening systems other than those disclosed may be used to secure the galley and lavatory units to the aircraft fuselage. Moreover, it is understood that the disclosed floor fitting 60 and 62 arrangement wherein each fitting is primarily resistant to a specific set of acceleration forces is similarly illustrative. In other versions of this system 12, it may be necessary to secure the galley and lavatory units with fittings that withstand sets of acceleration different than those described. The actual arrangement of fittings will depend on the specific construction of the individual galley and lavatory units.

Figure 17:
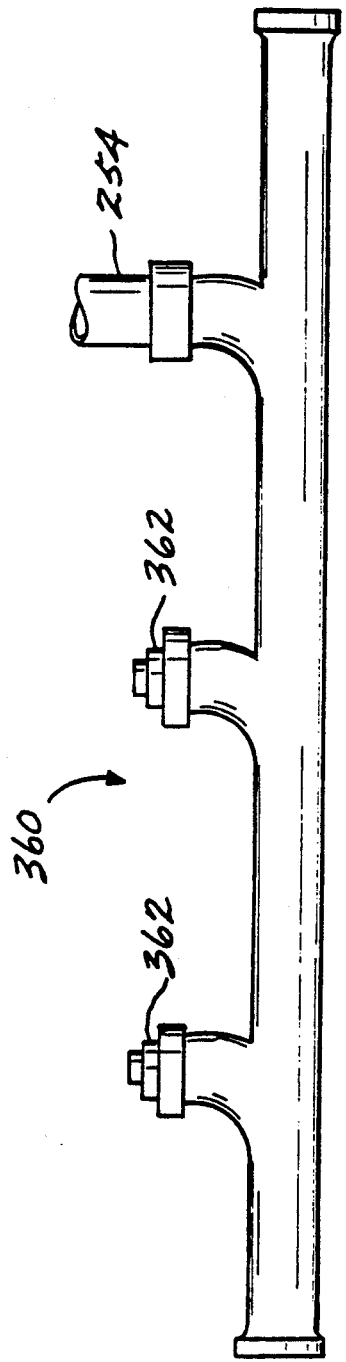
FIG. 17 is a view of an alternative collection pipe that can be used in alternative versions of the lavatory waste collection system of this invention.

Air, water, power and ventilation services may be provided to the galley and lavatory through distribution systems having features different from those of the described systems. For instance, in some versions of the invention, instead of providing gasper air to the portable units, regular air for the air conditioning duct may be supplied. In these embodiments of the system 12, the air conditioning duct is provided with outlet couplings to which an air line is attached. The air line is attached at its other end to an inlet coupling in the portable unit. In some embodiments of the system, it may be desirable to provide multiple water lines 32 to reduce or eliminate the number of branch water lines 334 that are required. Wastes, both from the galley and the lavatories may be collected and stored in systems distinct from those described. For example, as depicted in FIG. 17, in some embodiments of the system, the lavatory waste collection system may include fixed collection pipes 360 that run longitudinally through the fuselage. Each collection pipe 360 would have a number of longitudinally separated normally sealed spuds 362. Whenever a lavatory 16 or 18 is repositioned, a transverse pipe 254 is connected to a spud closest to the lavatory so that wastes can be drained into the holding tanks 42.

Moreover, it is also understood that the rectangular areas 20, 22 and 24 in which the galley 14, the centerline lavatory 16 and sidewall lavatory 18 are respectively located are similarly exemplary. In some versions of this invention the galley 14 and centerline lavatory 16 can quite readily be located in overlapping or identical positioning areas 20 and 22. It is also clear that in other versions of the system 12 it may be desirable to provide a sidewall galley.

Therefore, it is understood that these and other modifications fall within the scope of the appended claims and the claims are not limited by the disclosure of the preferred embodiment of the invention disclosed above.

The embodiments of the invention in which an exclusive property or privilege is claimed are defined as follows:

1. An aircraft cabin system for locating an interior unit inside an aircraft fuselage comprising:
   - at least one aircraft cabin interior unit having at least one wall panel and said unit requiring at least one utility service supplied thereto;
   - a fastening means for securing said at least one aircraft cabin interior unit to the aircraft fuselage at a multiple number of locations in the fuselage;
   - a service distribution means secured to the fuselage having a plurality of spaced-apart couplings for supplying said at least one utility service in said fuselage at a multiple number of locations; and
   - an adjustable conduit means connectable between said at least one aircraft cabin interior unit and an adjacent service distribution means coupling for providing said at least one aircraft cabin interior unit with said at least one utility service.

2. The aircraft cabin system of claim 1, wherein said fastening means comprises at least one seat track secured to a cabin floor in the aircraft fuselage, and at least one floor fitting integral with said at least one aircraft cabin interior unit wall panel for securing said wall panel to said at least one seat track.

3. The aircraft cabin system of claim 2, further including a plurality of floor fittings for securing said at least one aircraft cabin interior unit wall panel to said at least one seat track, at least two said floor fittings are resistant to acceleration forces oriented along different directions.

4. The aircraft cabin system of claim 2, wherein said fastening means further includes at least one tie-down assembly comprising:
   - a tie-down bar mounting unit attached to said at least one aircraft cabin interior unit;
   - a plurality of longitudinally spaced-apart frame fittings attached along an upper section of the aircraft fuselage; and,
   - a tie-down bar attached between said tie-down bar mounting unit and an adjacent frame fitting for securing said at least one aircraft interior unit to the aircraft fuselage.

5. The aircraft cabin system of claim 4, wherein said tie-down bar is attached to said at least one aircraft cabin interior unit relative to said interior unit at a selected angle; and wherein said tie-down bar mounting unit is selectively attached to said at least one aircraft cabin interior unit at a plurality of locations on said interior unit, so that when said tie-down bar is attached thereto, said tie-down bar will be at said selected angle.

6. The aircraft cabin system of claim 2, wherein said at least one utility service supplied to said at least one aircraft cabin interior unit is electrical power, and said system further includes: an electrical power cable that extends throughout a portion of the aircraft fuselage; a plurality of spaced-apart electrical outlet sockets connected to said electrical power cable, and a flexible power cable selectively connectable between said at least one aircraft cabin interior unit and an adjacent one of said electrical outlet sockets.

7. The aircraft cabin system of claim 2, wherein said at least one utility service supplied to said at least one aircraft cabin interior unit is water, and said system further includes: a water line that extends throughout a portion of the aircraft fuselage; a plurality of spaced-apart outlet couplings attached to said water line; and, a flexible water line selectively connectible between said at least one aircraft cabin interior and an adjacent one of said water line outlet couplings.

8. The aircraft cabin system of claim 7, wherein said water line outlet couplings are self-sealing such each said coupling is only open when said flexible water line is connected to said coupling.

9. The aircraft cabin system of claim 8, wherein said waterline extends longitudinally through at least a portion of the aircraft fuselage and said outlet couplings are longitudinally spaced apart.

10. The aircraft cabin system of claim 9, further including at least one branch waterline connected to said waterline, said branch waterline extending laterally through at least a portion of the aircraft fuselage and an outlet coupling attached to said broad water line, said outlet coupling connectable to said flexible water line.

11. The aircraft cabin system of claim 10, further including a plurality of said branch water lines connected to said water line, at least two said branch water lines longitudinally spaced from each other.

12. The aircraft cabin system of claim 8, further including a cabin waste collection including a portable tank selectively attachable to said aircraft cabin interior unit for storing waste water.

13. The aircraft cabin system of claim 8, wherein a waste holding unit is mounted in the aircraft fuselage and said system further includes a waste water collection system including a plurality of pipe sections selectively coupled together starting at the holding unit and extending to said aircraft cabin interior unit for serving as conduit for waste from said aircraft cabin interior unit to said waste holding unit.

14. The aircraft cabin system of claim 2, wherein said at least one utility service supplied to said at least one aircraft cabin interior unit is ventilation, and said system further includes: a vent duct through which air is exhausted that extends throughout a portion of the aircraft fuselage; a plurality of inlet ports integral with said vent duct; and, a flexible hose selectively connectible between said at least one aircraft cabin interior unit and an adjacent one of said vent duct inlet ports.

15. The aircraft cabin system of claim 2, wherein said at least one utility service supplied to said at least one aircraft interior unit is gasper air, and said system further includes: a gasper air line through which gasper air is supplied that extends throughout a portion of the aircraft fuselage; a plurality of spaced-apart air outlets attached to said gasper air line; and, a flexible air line selectively connectible between said at least one aircraft cabin interior unit and an adjacent one of said gasper air outlets.

16. The aircraft cabin system of claim 1, wherein:
said at least one aircraft cabin interior unit is a galley selectably locatable in a fuselage galley location having an electrical component requiring electrical power attached to said at least one wall panel, and a sink requiring water attached to said at least one wall panel; and said system further includes:
an electrical power cable that extends through the aircraft fuselage adjacent a fuselage location in which said galley is selectively located, a plurality of spaced-apart electrical outlet sockets connected to said electrical power cable adjacent said selected fuselage location, and a flexible power cable selectively connectible between said galley and an adjacent one of said electrical outlet sockets; and
a water line that extends through the aircraft fuselage adjacent said selected fuselage area, and a plurality of spaced-apart outlet couplings attached to said water line and located adjacent said selected fuselage location, and a flexible water line selectively connectible between said galley and an adjacent one of said outlet couplings.

17. The aircraft cabin system of claim 16 wherein the aircraft includes a plurality of spaced-apart seat tracks in a cabin floor in said fuselage galley location, and wherein said galley further includes:
at least two interconnected wall panels; and
at least one floor fitting located in each said galley wall panel adjacent the cabin floor, each said floor fitting adapted for coupling to an underlying said seat track at a plurality of locations along said underlying seat track.

18. The aircraft cabin system of claim 16, wherein said galley further includes a self-contained waste water collection system connected to said galley sink for storing waste water from said galley sink.

19. The aircraft cabin system of claim 18, wherein said galley waste water collection system includes a portable holding tank selectively connectible to said galley sink.

20. The aircraft cabin system of claim 19, wherein said holding tank is located in a portable food service cart located in said galley.

21. The aircraft cabin system of claim 16, wherein said galley is supplied with ventilation services, and said system further includes: a vent duct through which air is exhausted that extends through the aircraft fuselage adjacent said selected fuselage location; a plurality of spaced-apart inlet ports integral with said vent duct and adjacent said selected fuselage location; and, a flexible hose selectively connectible between said galley and an adjacent one of said vent duct inlet ports.

22. The aircraft cabin system of claim 16, wherein said galley is supplied with gasper air, and said system further includes: a gasper air line through which gasper air is supplied that extends through a portion of the aircraft fuselage adjacent said selected fuselage location; a plurality of spaced-apart air outlets attached to said gasper air line adjacent said selected fuselage location; and, a flexible air line selectively connectible between said galley and an adjacent one of said gasper air outlets.

23. The aircraft cabin system of claim 16, further including at least one tie-down assembly comprising: a tie-down bar mounting unit attached to said galley; a plurality of longitudinally spaced-apart frame fittings attached along an upper section of the aircraft adjacent said selected fuselage location; and, a tie-down bar attached between said tie-down bar mounting unit and an adjacent frame fitting for securing said galley to the aircraft fuselage.

24. The aircraft cabin system of claim 23, wherein said tie-down bar is attached to said galley relative to said galley at a selected angle; and wherein said tie-down bar mounting unit is selectively attached to said galley at a plurality of locations on said galley, so that when said tie-down bar is attached to said tie-down bar mounting unit, said tie-down bar will be at said selected angle.

25. The aircraft cabin system of claim 17, wherein at least two said floor fittings are resistant to acceleration forces oriented along different directions.

26. The aircraft cabin system of claim 16, further including: a lavatory selectively locatable in a fuselage lavatory location, said lavatory having a plurality of wall panels, an electrical component requiring electrical power attached to one of said wall panels, a sink requiring water attached to one of said wall panels, and wherein
said system further includes:
a plurality of spaced-apart outlet sockets connected to said electrical power cable adjacent said selected fuselage lavatory location, and a flexible lavatory power cable selectively connectible between said lavatory and an adjacent one of said electrical outlet sockets; and
a plurality of spaced-apart water outlet couplings attached to said water line and located adjacent said selected fuselage lavatory location, and a flexible lavatory water line selectively connectible between said lavatory and an adjacent one of said outlet couplings.

27. The aircraft cabin system of claim 26, further including a lavatory waste water collection system connectible to said lavatory sink and said lavatory bowl.

28. The aircraft cabin system of claim 27, wherein said lavatory waste collection system includes a plurality of pipe sections selectively coupled together, said pipe sections of sufficient length to extend from a waste holding unit to said lavatory.

29. The aircraft cabin system of claim 28, wherein at least one of said lavatory waste collection system pipe sections is a telescopically adjustable pipe section.

30. The aircraft cabin system of claim 28, further including an offset connector for connecting said lavatory bowl and said lavatory sink to said lavatory waste collection system pipe sections, and a coupling for connecting said offset connector to said lavatory sink and said lavatory bowl whereby said offset connector can be coupled to said sink and said bowl in at least two positions.

31. The aircraft cabin system of claim 26, wherein said fuselage galley location and said fuselage lavatory location at least partially overlap.

* * * * *